(12) United States Patent
Nanasawa et al.

(10) Patent No.: US 12,412,059 B2
(45) Date of Patent: Sep. 9, 2025

(54) ENCRYPTION METHOD USING SPIRAL PATTERN, CORRESPONDING DECRYPTION METHOD, AND METHOD FOR MARKING DESIGN ENCRYPTED USING SPIRAL PATTERN

(71) Applicant: neten Inc., Kofu (JP)

(72) Inventors: Kiyohito Nanasawa, Kofu (JP); Wataru Isobe, Kofu (JP)

(73) Assignee: NETEN INC., Kofu (JP)

( * ) Notice: Subject to any disclaimer, the term of this patent is extended or adjusted under 35 U.S.C. 154(b) by 0 days.

(21) Appl. No.: 18/906,429

(22) Filed: Oct. 4, 2024

(65) Prior Publication Data

US 2025/0117617 A1     Apr. 10, 2025

(30) Foreign Application Priority Data

Oct. 5, 2023   (JP) .................................. 2023-173893

(51) Int. Cl.
 *G06K 19/06*   (2006.01)

(52) U.S. Cl.
 CPC . *G06K 19/06037* (2013.01); *G06K 19/06046* (2013.01)

(58) Field of Classification Search
 None
 See application file for complete search history.

(56) References Cited

U.S. PATENT DOCUMENTS

| | | | |
|---|---|---|---|
| 5,691,527 A | 11/1997 | Hara et al. | |
| 7,006,248 B1 | 2/2006 | Tani | |
| 11,648,792 B2 * | 5/2023 | Hsu | G06F 16/9035 |
| | | | 235/494 |

FOREIGN PATENT DOCUMENTS

| | | |
|---|---|---|
| CN | 108985419 A | 12/2018 |
| JP | S57-151668 U1 | 9/1982 |
| JP | H02-002769 U1 | 1/1990 |
| JP | H08-180125 A | 7/1996 |
| JP | 2007-102790 A | 4/2007 |
| JP | 2015110308 A * | 6/2015 |
| JP | 2023-120937 A | 8/2023 |
| WO | WO-2021061084 A1 * | 4/2021 |

\* cited by examiner

*Primary Examiner* — Kristy A Haupt
(74) *Attorney, Agent, or Firm* — Rabin & Berdo, P.C

(57) ABSTRACT

An encryption method for encrypting a piece of information using a spiral pattern, includes: creating, by a processor, an encryption code table that contains a plurality of encryption codes, and a plurality of numerical values respectively allocated to the plurality of encryption codes; encrypting, by the processor, the piece of information using the encryption code table, to thereby obtain an array of the numerical values; and converting, by the processor, each numerical value in the array to a wave segment having a wavelength corresponding to a multiple of said each numerical value, each of the plurality of wave segments being connected to each other to form a continuous wave that spirals outward in the spiral pattern.

12 Claims, 55 Drawing Sheets

ENCRYPTION METHOD USING SPIRAL PATTERN, CORRESPONDING DECRYPTION METHOD, AND METHOD FOR MARKING DESIGN ENCRYPTED USING SPIRAL PATTERN

CROSS-REFERENCE TO RELATED APPLICATION

The present application claims benefit of priority to Japanese Patent Application No. 2023-173893 filed on Oct. 5, 2023, the entire contents of which are incorporated herein by reference.

BACKGROUND

The present disclosure relates to an encryption method using a spiral pattern, such as an algebraic spiral, an involute curve, or the like, a corresponding decryption method, and a method for marking a design encrypted using a spiral pattern.

Conventionally, a two-dimensional code reading device used for reading a two-dimensional code obtained by making data expressed by a binary code into a cell, arranging the cell as a pattern on a two-dimensional matrix, and arranging a positioning symbol formed of a pattern in which a same frequency component ratio can be achieved in scanning lines each crossing a center at all angles at least in two predetermined positions in the matrix has been known.

SUMMARY

An encryption method using a spiral pattern has a configuration including creating, by a processor, an encryption code table in which numerical values corresponding to original data are allocated, encrypting, by the processor, information that is to be transmitted as an array of consecutive numerical values using the encryption code table, and converting, by the processor, the encrypted array of the numerical values to continuous waves each having a wavelength corresponding to a multiple of a corresponding one of the numerical values and a specific amplitude to arrange the continuous waves in a spiral pattern shape spreading with an origin centered.

A decryption method using a spiral pattern has a configuration including displaying a design having a spiral pattern shape arranged in accordance with the encryption method using a spiral pattern, reading the design by a reading device, converting, by a processor, the wavelength of the continuous waves read by the reading device to an array of consecutive numerical values, and decrypting, by the processor, the array of the numerical values using the encryption code table.

A method for marking a design encrypted by the encryption method using a spiral pattern has a configuration in which the design encrypted using a spiral pattern is printed, marked, or etched and that includes instructing, by a processor, a surface processing machine to print, mark, or etch the spiral pattern obtained by arranging the continuous waves in a spiral pattern shape spreading with the origin centered on a surface of a product.

In the configurations described above, encrypted information is represented in a spiral pattern, and thus, an encryption technology that can seek for design aesthetics can be provided.

BRIEF DESCRIPTION OF THE DRAWINGS

FIG. 10A-1 is a diagram illustrating a case where S is output as $S_R$ and $S_L$.

FIG. 10A-2 is a partially enlarged view of FIG. 10A-1.

FIG. 10B-1 is a diagram illustrating a case where S is output as $S_R$ and $S^{rev}_L$.

FIG. 10B-2 is a partially enlarged view of FIG. 10B-1.

FIG. 10C-1 is a diagram illustrating a case of {1.0, 0.25}, P=250, and $S_R$ and $S_L$.

FIG. 10C-2 is a diagram illustrating a case of {1.0, 0.25}, P=250, and $S_R$ and $S^{rev}_L$.

FIG. 10D-1 is a diagram illustrating $S_R$ and $S_L$ in a case where all of numerical values of A" are the same.

FIG. 10D-2 is a diagram illustrating $S_R$ and $S^{rev}_L$ in a case where all of numerical values of A" are the same.

FIG. 17-1 is a diagram illustrating a case where only [Square Wave] is turned on with a basic figure setting kept.

FIG. 17-2 is a diagram illustrating a user interface corresponding to the diagram shown in FIG. 17-1.

FIG. 18A-1 is a diagram illustrating a case where S Size is changed as (100→50).

FIG. 18A-2 is a diagram illustrating a user interface corresponding to the diagram shown in FIG. 18A-1.

FIG. 18B-1 is a diagram illustrating a case where S Size is changed as (100→200).

FIG. 18B-2 is a diagram illustrating a user interface corresponding to the diagram shown in FIG. 18B-1.

FIG. 19-1 is a diagram illustrating a case where a value of S Blank is set to a value five times a value of the basic figure.

FIG. 19-2 is a diagram illustrating a user interface corresponding to the diagram shown in FIG. 19-1.

FIG. 20-1 is a diagram illustrating a case where a phase S is set to S ($\varphi_R=\pi$, $\varphi_L=\pi$).

FIG. 20-2 is a diagram illustrating a user interface corresponding to the diagram shown in FIG. 20-1.

FIG. 21A-1 is a diagram illustrating a case where W Amplitude is set to ⅔ of that of the basic figure.

FIG. 21A-2 is a diagram illustrating a user interface corresponding to the diagram shown in FIG. 21A-1.

FIG. 21B-1 is a diagram illustrating a case where W Amplitude is set to 5/3 of that of the basic figure.

FIG. 21B-2 is a diagram illustrating a user interface corresponding to the diagram shown in FIG. 21B-1.

FIG. 22A-1 is a diagram illustrating a case where W Size is set as 7800→3900.

FIG. 22A-2 is a diagram illustrating a user interface corresponding to the diagram shown in FIG. 22A-1.

FIG. 22B-1 is a diagram illustrating a case where W Size is set as 7800→15600.

FIG. 22B-2 is a diagram illustrating a user interface corresponding to the diagram shown in FIG. 22B-1.

FIG. 23-1 is a diagram illustrating a case where W Resolution is changed as 256→3.

FIG. 23-2 is a diagram illustrating a user interface corresponding to the diagram shown in FIG. 23-1.

FIG. 24A-1 is a diagram illustrating a case where Scale is set as 3.7→1.0.

FIG. 24A-2 is a diagram illustrating a user interface corresponding to the diagram shown in FIG. 24A-1.

FIG. 24B-1 is a diagram illustrating a case where Scale is set as 3.7→10.0.

FIG. 24B-2 is a diagram illustrating a user interface corresponding to the diagram shown in FIG. 24B-1.

FIG. 25-1 is a diagram illustrating a case where S Repeat is set as 1→3.

FIG. 25-2 is a diagram illustrating a user interface corresponding to the diagram shown in FIG. 25-1.

FIG. 26-1 illustrates an example where various settings are changed.

FIG. 26-2 is a diagram illustrating a user interface corresponding to the diagram shown in FIG. 26-1.

DETAILED DESCRIPTION

Figure 1:
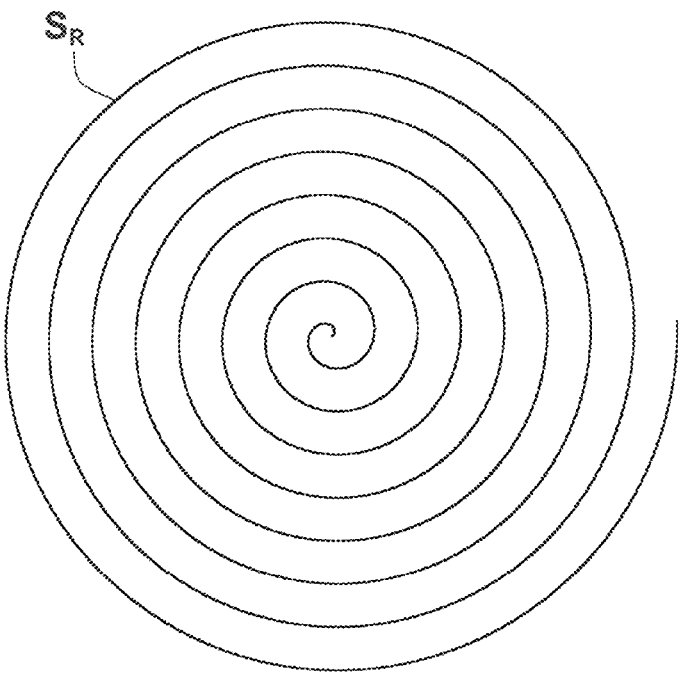
FIG. 1 is a diagram illustrating an example where $S_R$ is arranged on an xy plane.

A one-dimensional code, such as a bar code, and a two-dimensional code described in Japanese Unexamined Patent Publication No. H08-180125, has a restriction in design in order to emphasis on functions thereof. However, there is a need for an encryption technology that allows retention of a minimum necessary function with a beautiful appearance.

In view of the foregoing, it is an object of the present disclosure to provide an encryption and decryption technology that can seek for design aesthetics.

In order to achieve the above-described object, in the present disclosure, encrypted information is represented in a spiral pattern shape.

Specifically, according to a first aspect of the present disclosure, an encryption method using a spiral pattern has a configuration including creating, by a processor, an encryption code tale in which numerical values corresponding to original data are allocated, encrypting, by the processor, information that is to be transmitted as an array of consecutive numerical values using the encryption code table, and converting, by the processor, the encrypted array of the numerical values to continuous waves (hereinafter, also referred to as wave segments) each having a wavelength corresponding to a multiple of a corresponding one of the numerical values and a specific amplitude to arrange the continuous waves in a spiral pattern shape spreading with an origin centered.

According to the configuration described above, a pretty good appearance can be achieved since the information that is to be transmitted is represented in a spiral pattern shape, and the encryption method of the first aspect is a simple encryption method, so that decryption can be easily performed. A reason why the encrypted array of the numerical values is converted to the continuous waves each having the wavelength corresponding to the multiple of the corresponding one of the numerical values and the specific amplitude is, in an extreme example, to adjust the continuous waves to a proper size such that numerical decryption later is not difficult, and this configuration has actually a characteristic that, the larger the multiple is, the more accurate decryption becomes. On the other hand, in view of an aesthetic impression given to humans, when the multiple is extremely large, an obtained pattern spoils an appearance in some cases. The spiral pattern is formed of an algebraic spiral, an involute curve, or the like, and the algebraic spiral includes an Archimedes's spiral (spiral line), a radiated spiral, a hyperbolic spiral, a Riches spiral, or the like.

According to a second aspect of the present disclosure, the encryption method of the first aspect has a configuration in which, in encrypting the information that is to be transmitted as the array of the consecutive numerical values, the continuous waves are arranged continuously in an algebraic spiral shape in a specific circular area.

According to the configuration described above, the continuous waves are represented in an algebraic spiral shape in a specific circular range, and therefore, a beautiful appearance can be achieved and a range is limited, so that a displayed design can be easily handled.

According to a third aspect of the present disclosure, the encryption method of the first aspect has a configuration in which, in arranging the continuous waves in a spiral pattern shape spreading with the origin centered, the continuous waves are continuously arranged in an involute curved shape in a specific circular area.

According to the configuration described above, the continuous waves are represented in an involute curved shape in a specific circular range, and therefore, a beautiful appearance can be achieved and a range is limited, so that a displayed design can be easily handled.

According to a fourth aspect of the present disclosure, the encryption method of any one of the first to third aspects has a configuration in which, in arranging the continuous waves in a spiral pattern shape spreading with the origin centered, the encrypted array of the numerical values is converted to continuous sine waves or square waves having a wavelength corresponding to a multiple of a corresponding one of the numerical values and a specific amplitude.

According to the configuration described above, when the continuous waves are sine waves or square waves, a beautiful appearance is achieved and decryption is easy.

According to a fifth aspect of the present disclosure, the encryption method of any one of the first to fourth aspects has a configuration in which, in arranging the continuous waves in a spiral pattern shape spreading with the origin centered, an initial blank portion in which the continuous waves are not arranged is provided in a predetermined range with the origin centered.

When the waves are arranged also in a range close to the origin 0, a curvature of the spiral pattern, such as an algebraic spiral, an involute curve, or the like, is large in a forward direction and a normal direction, and therefore, decryption is actually difficult to perform, and distortion of the spiral pattern in the forward direction and the normal direction appears large, so that an entire appearance is degraded. However, according to the configuration described above, distortion is not increased, the appearance is not degraded, and decryption can be easily performed. Furthermore, with the initial blank portion provided, in decrypting, a central portion can be easily found as a guide mark.

According to a sixth aspect of the present disclosure, the encryption method of any one of the first to fifth aspects has a configuration in which, in arranging the continuous waves in a spiral pattern shape spreading with the origin centered, the continuous waves are arranged in a spiral pattern shape extending with the origin centered and are also arranged with an imaged spiral pattern obtained by rotating the spiral pattern by 180 degrees with a same origin centered and thus imaging.

According to the configuration described above, the imaged spiral pattern obtained by rotating the spiral pattern by 180 degrees and thus imaging is added, so that figures with different appearances can be provided, and different modes can be provided with or without mapping. Therefore, in decrypting, it is needed to select a mode, and thus, a security level is increased. Moreover, advantageously, even when there is a data deficiency (for example, ink missing due to malfunction of a printing machine or the like) on one of the spiral patterns in decrypting, information can be correctly restored from data on the other one of the spiral patterns.

According to a seventh aspect of the present disclosure, the encryption method of any one of the first to fifth aspects has a configuration in which, in arranging the continuous waves in a spiral pattern shape spreading with the origin centered, when the continuous waves are arranged in a spiral pattern shape extending with the origin centered and are also arranged with an imaged spiral pattern obtained by rotating the spiral pattern by 180 degrees with a same origin centered and thus imaging, plus or minus is set for each normal height.

According to the configuration described above, work effects similar to those of the fifth aspect can be achieved, and by generating also a pattern with plus and minus reversed at the same time, a plurality of modes can be set and a different mode can be excluded by designating a mode in decrypting. This is for increasing the security level. Advantageously, in a setting in accordance with an aesthetic viewpoint, the appearance is changed.

According to an eighth aspect of the present disclosure, the encryption method of any one of the first to seventh aspects has a configuration in which, in arranging the continuous waves in a spiral pattern shape spreading with the origin centered, with a lapse of time, the continuous waves are arranged in a spiral pattern shape extending with the origin centered and are stored as a still image.

According to the configuration described above, the continuous waves are a still image, handling is easy. On the other hand, even when the information that is to be encrypted is long, the continuous waves ae sequentially sent and recorded as a still image, as appropriate, so that the entire information can be recorded.

According to a ninth aspect of the present disclosure, the encryption method of any one of the first to seventh aspects has a configuration in which, in arranging the continuous waves in a spiral pattern shape spreading with the origin centered, with a lapse of time, the continuous waves are arranged in a spiral pattern shape extending with the origin centered and are stored as a moving image.

According to the configuration described above, even when the information that is to be encrypted is long, the continuous waves are sequentially sent and recorded as a moving image, so that the entire information can be recorded.

According to a tenth aspect of the present disclosure, the encryption method of any one of the first to ninth aspects has a configuration in which, in arranging the continuous waves in a spiral pattern shape spreading with the origin centered, a start point of the continuous waves is marked with a marker, and thus, the start point is displayed.

According to the configuration described above, the start point is made clearly indicated, so that decryption can be made very easy.

A decryption method according to an eleventh aspect of the present disclosure has a configuration including displaying a design having a spiral pattern shape arranged in accordance with the encryption method using a spiral pattern according to any one of the first to tenth aspect, reading the design by a reading device, converting, by a processor, the wavelength of the continuous waves read by the reading device to an array of consecutive numerical values, and decrypting, by the processor, the array of the numerical values using the encryption code table.

According to the configuration described above, since the decryption method of the eleventh aspect is a simple encryption method in which the information that is transmitted is represented in a spiral pattern, the encrypted information can be easily decrypted by using the encryption code that has been generated in advance.

A computer-readable recording medium in which a program is recorded has a configuration in which a program that causes a processor to allocate numeral values and an encryption code, encrypt input information that is to be transmitted as an array of consecutive numerical values using the encryption code, convert the encrypted array of the numerical values to continuous waves each having a wavelength corresponding to a multiple of a corresponding one of the numerical values and a specific amplitude to arrange the continuous waves in a spiral pattern shape spreading with an origin centered is recorded.

According to the configuration described above, the program recoded in the recording medium is installed in a computer and is executed on the computer, work effects of the present disclosure are reliably and easily exhibited. Moreover, distribution of the program is facilitated.

A method for marking a design encrypted by the encryption method using a spiral pattern according to the encryption method has a configuration including allocating, by a processor, numerical values and an encryption code, encrypting, by the processor, input information that is to be transmitted as an array of consecutive numerical values using the encryption code, converting, by the processor, the encrypted array of the numerical values to continuous waves each having a wavelength corresponding to a multiple of a corresponding one of the numerical values and a specific amplitude, and instructing, by the processor, a surface processing machine to print, mark, or etch the continuous waves in a spiral pattern shape spreading with the origin centered on a surface of a product.

According to the configuration described above, by printing, marking, and etching the spiral pattern (through etching processing using a corrosion action of a chemical agent or the like), such as an algebraic spiral, an involute curve, or the like, in which specific information is encrypted and that has a beautiful appearance, a commercial value of a product is increased.

As has been described above, according to the present disclosure, encrypted information is represented in a spiral pattern shape, so that an encryption technology that can seek for design aesthetics can be provided.

Embodiments of the present disclosure relate to an encryption method using a spiral pattern that can encrypt a numerical value in accordance with a specific plane filling method and allows obtaining of the numerical value by measurement in decrypting and a corresponding decryption method.

Figure 28:
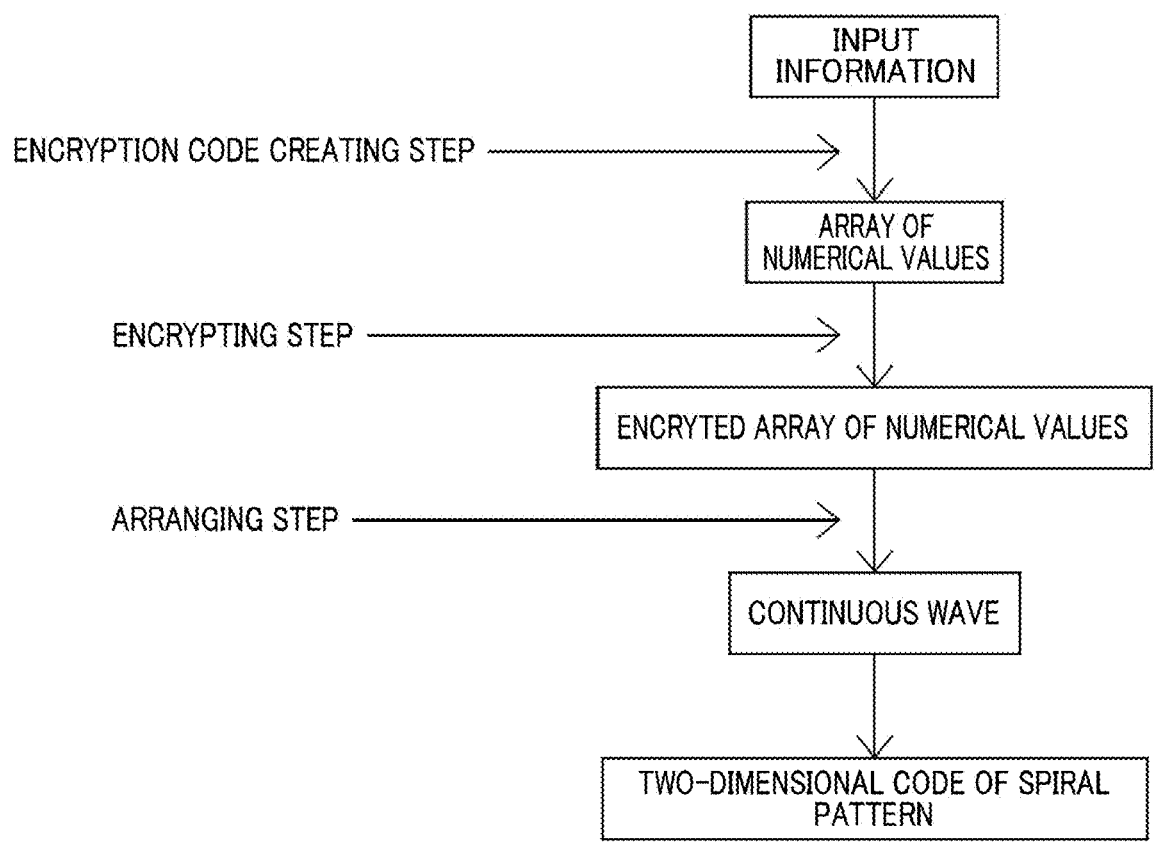
FIG. 28 is a flowchart illustrating an outline of the encryption method using a spiral pattern according to an embodiment of the present disclosure.

As illustrated in FIG. 28, an encryption method according to this embodiment includes an encryption code creating step of creating, by a processor, an encryption code table in which numerical values corresponding to original data are allocated, an encrypting step of encrypting, by the processor, information that is to be transmitted as an array of consecutive numerical values using the encryption code table, and an arranging step of converting, by the processor, the encrypted array of the numerical values to continuous waves each having a waveform corresponding to a multiple of a corresponding one of the numerical values and a specific amplitude to arrange the continuous waves as a two-dimensional code having a spiral pattern shape spreading with an origin centered.

This embodiment also includes a decryption method using a spiral pattern. The decryption method includes displaying a design having a spiral pattern shape arranged by the encryption method using a spiral pattern, reading the design by a reading device, converting the wavelengths of the continuous waves read by the reading device to an array of consecutive numerical values, and decrypting the array of the numerical values using the encryption code.

Figure 27:
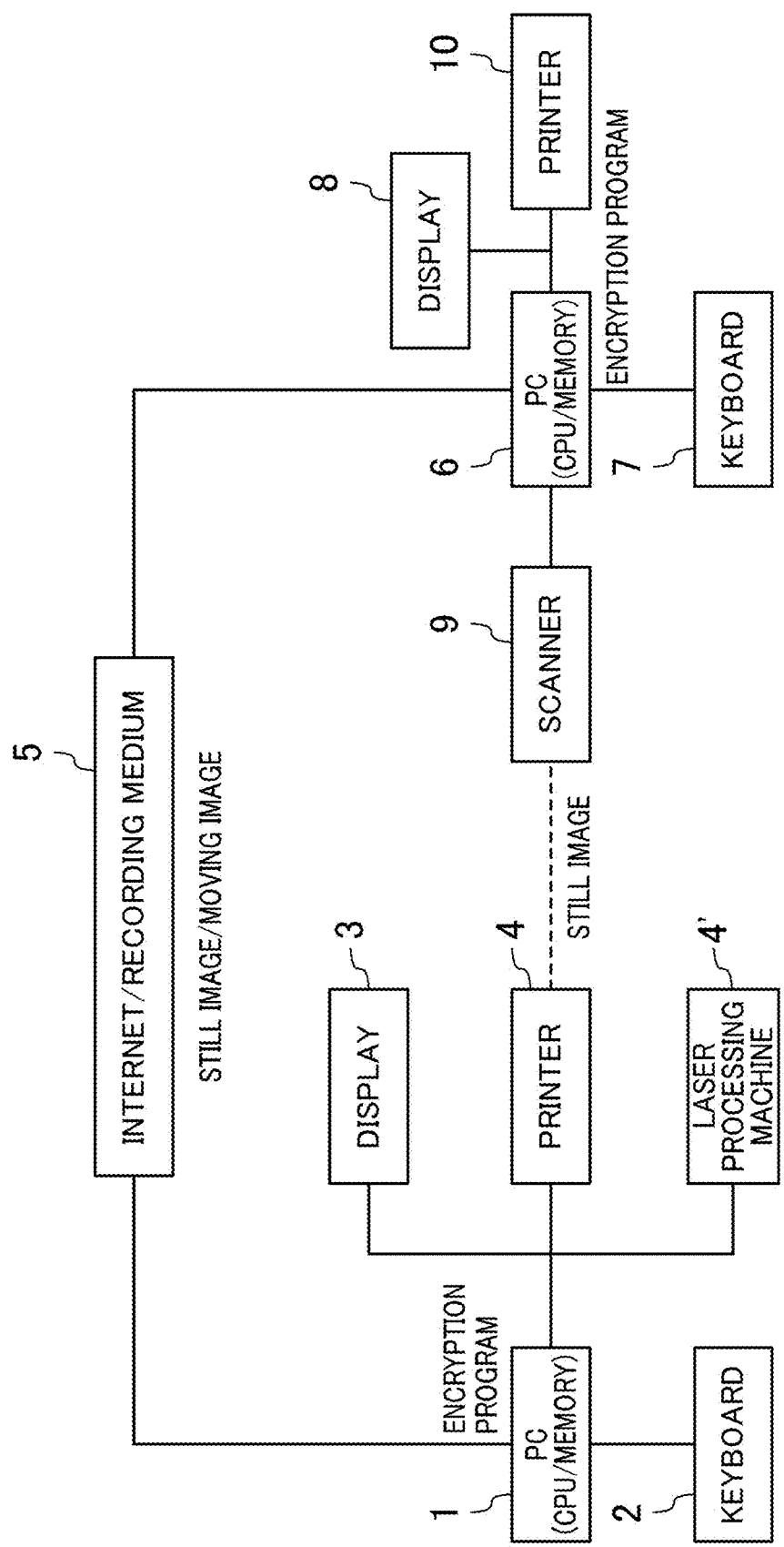
FIG. 27 is a diagram illustrating an outline of an example of a configuration of a device that implements an encryption method and a decryption method each using a spiral pattern.

The encryption method and the decryption method are realized, for example, by a system simply illustrated in FIG. 27. Specifically, an encryption program that causes a computer to allocate numerical values and an encryption code, encrypt input information that is to be transmitted as an array of consecutive numerical values using the encryption code, convert the encrypted array of the numerical values to continuous waves each having a wavelength corresponding to a multiple of a corresponding one of the numerical values and a specific amplitude to arrange the continuous waves in a spiral pattern spreading with an origin centered is created in advance and is installed in a personal computer (PC) 1 as the computer. Similarly, the encryption code described above is created and is downloaded to the PC1 in advance.

Then, the encrypting step that will be described later can be displayed on a display 3 while being input via the keyboard 2 using a program, be printed on paper or the like by a printer 4, and be laser marked on a surface of a product by a laser processing machine 4' as a surface processing machine, and an image data, a pdf file, or a moving image data obtained thereby can be transmitted or be carried via the Internet (including an inhouse network) or a recording medium 5. This technology can be used for an electronic display medium, such as a digital signage, or the like.

On the other hand, a decryption program is installed in another PC6 for decryption in advance.

Information encrypted by the PC1 or the like is read by a scanner 9 or a camera (not illustrated) as the reading device when the information is printed on paper and is fetched by the PC6 as the reading device via the Internet or the recording medium 5 when the information is electronic data, such as image data or the like, and, while an input work via the keyboard 7 is performed, encrypted information is displayed on a display 8, and is output by a printer 10.

When the information is a moving image, there is a disadvantage that, in decrypting, the reading device has to be held over the information during reproduction of the moving image. In decrypting, a setting of a time of the moving image is needed to be known by a decryption side. When information of a start position, a reproduction time of the moving image, or the like is input to the decryption side, determination thereon can be thus performed. For example, as a possible way of use, the information can be used as a code in determining up, down, left, and right of the two-dimensional code. A method in which a marker representing a starting time of the information that will be described later is provided can be used.

Next, in the encrypting step, the information that is to be transmitted is encrypted as an array of consecutive numerical values using the encryption code.

In the encrypting step, with the numerical value and the code allocated in advance, information can be encrypted in accordance with the numerical value and the code, using an encryption code table, for example.

For example, the encryption code, such as "A" as 0.5, "B" as 0.9, or the like, that has been arbitrarily determined is created in advance. For example, by allocating alphabetic characters to the encryption code, a URL that is used for a QR code or the like in many cases can be embedded.

—Basis of Two-Dimensional Numeric Code Embedding Technology—

The arranging step that is performed next will be described in detail. First, an algebraic spiral (representatively, an Archimedes spiral line (Archimedes's spiral)) or an involute curve is prepared as a spiral pattern. The term "spiral" includes a three-dimensional, stereoscopic spiral in some cases. However, as used herein, the term "spiral line"

refers to a two-dimensional spiral line. Even a stereoscopic spiral can be dropped (projected) onto a plane. By using the Archimedes spiral line or the involute curve, information can be plane-filled in a specific circular area.

In this embodiment, for example, the Archimedes spiral line is used. The Archimedes spiral line is a curved line expressed by r=aθ in a polar coordinate equation. In expression with parameters, this curved line can be expressed by x=θ cos θ and y=θ sin θ. The prepared entire Archimedes spiral line is represented by $S_R$. Although detailed illustration and description are omitted, $S_R$ may be an involute curve.

Note that, when $r=a\theta^{1/2}$, the spiral is a Fermat's spiral in which an interval gradually narrowed, when $r=a\theta^2$, the spiral is a spiral in which an interval is gradually widened, when r=a/θ, the spiral is a hyperbolic spiral in which an interval is gradually widened, and when $r=a/\theta^{1/2}$, the spiral is a Riches spiral in which an interval is gradually widened. Basic curved lines may be these algebraic spirals. Although, when the spiral is a hyperbolic spiral or a Riches spiral in which an interval is gradually widened, a curved line range is large, and a central portion may be mainly used for encryption and decryption.

In accordance with the equation of parameters, as illustrated in FIG. 1, $S_R$ is arranged on the xy plane. An origin 0 of coordinates is center of a spiral line.

Figure 2:
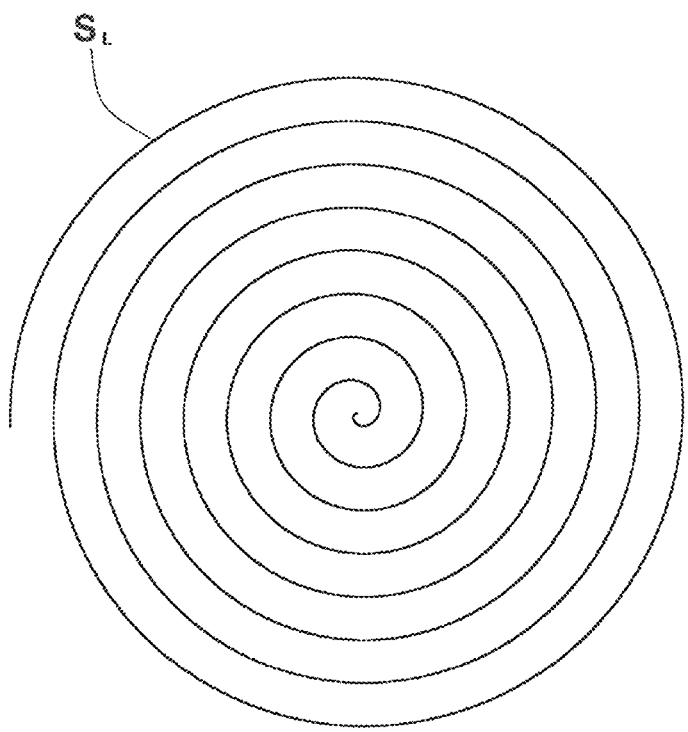
FIG. 2 is a diagram illustrating $S_L$ obtained by rotating $S_R$ on the xy plane by 180 degrees with an origin centered and thus imaging.

As illustrated in FIG. 2, an image (imaged spiral line) obtained by rotating $S_R$ by 180 degrees with the origin centered on the xy plane is $S_L$. When $S_R$ is an involute curve, $S_L$ is a map involute curve.

Figure 3:
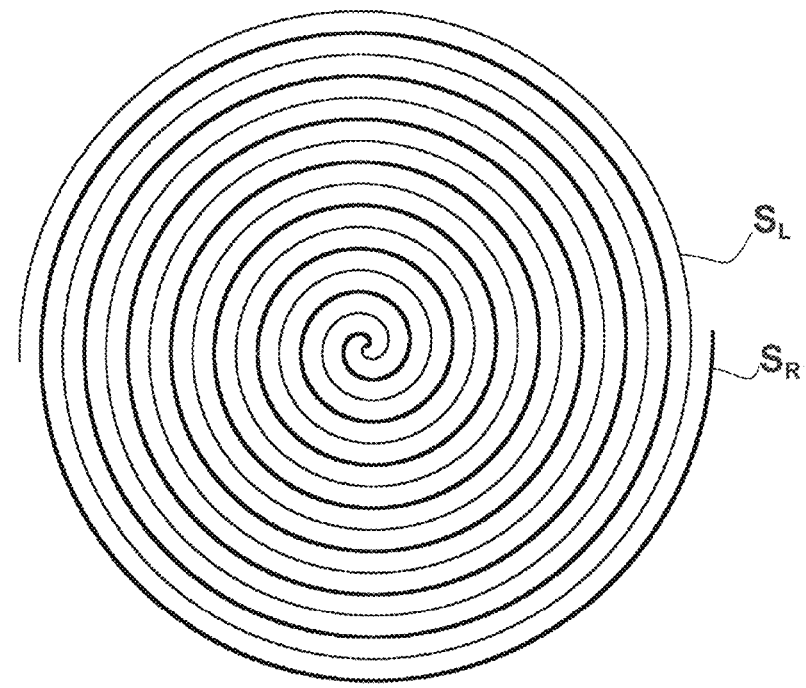
FIG. 3 is a diagram illustrating $S_R$ and $S_L$ superimposed.

When $S_R$ and $S_L$ are superimposed, a design illustrated in FIG. 3 is obtained. In FIG. 3, a bold line represents $S_R$ and a thin line represents $S_L$. Hereinafter, when R or L is not specifically designated for $S_R$ and $S_L$ and simply S is indicated, S represents a general spiral line drawn in the above-described manner. Also, in the following description, symbols related to R and L, that is, for example, $N_R$ and $N_L$, are used, each of $N_R$ and $N_L$ can be represented simply by N. In that case, general description is given, not particularly for R and L.

A reason why $S_L$ is used with respect to $S_R$ is that, even when there is a data deficiency (ink missing due to malfunction of a printing machine or the like) in one of the spiral lines, that is, $S_R$, in decrypting, the data deficiency can be compensated as long as information of the other one of the spiral lines, that is, $S_L$, can be correctly restored.

Arrays A of arbitrary positive real numbers are prepared. Each of the arrays A has an arbitrary number of elements. For example, A={0.3, 0.5, 1.2, 0.5, 1.6}.

An nth array is represented by An. The number of elements A is N (natural number). In the above-described example, A1=0.3, A3=1.2, and N=5.

Figure 4:
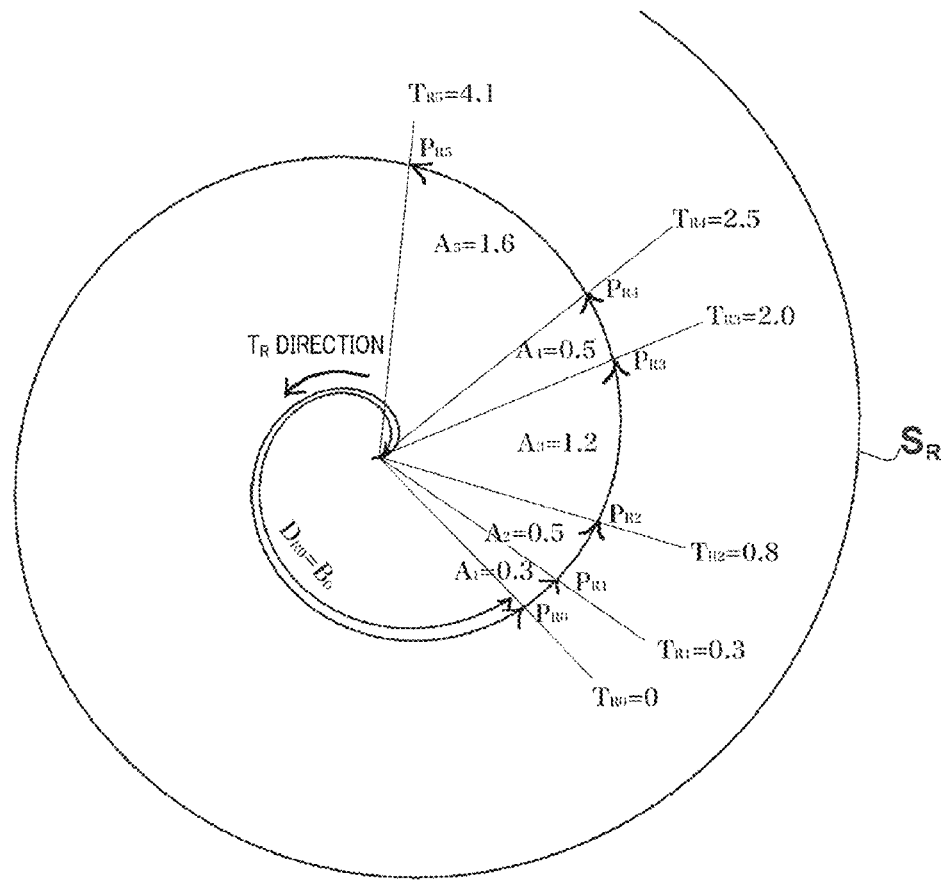
FIG. 4 is a diagram illustrating how points are marked on $S_R$ using an array A.

As illustrated in FIG. 4, points are marked on $S_R$ in accordance with the following procedures using the arrays A. As for $S_R$, in a spiral line spreading from the origin 0, a forward direction of a line drawn with the origin 0 as a start point is a $T_R$ direction.

An arbitrary point $P_{Rn}$ can be marked starting from the origin 0. A distance of a curved line from the origin 0 to $P_{Rn}$ is represented by $D_{Rn}$. In defining an actual distance on the xy plane, a constant M exists in terms of internal processing. The constant M represents a unit of length and, for example, is 1 mm. In a step of actually generating a diagram that will be performed later, the constant M is adapted to all of the arrays A. That is, when A={0.3, 0.5, 1.2, 0.5. 1.6}, A×M={0.3 mm, 0.5 mm, 1.2 mm, 0.5 mm, 1.6 mm}. On the other hand, in this description, with the existence of the constant M, the description is made redundant, and thus, the constant M is omitted, so that the array A is represented simply as {0.3, 0.5, 1.2, 0.5. 1.6}.

On the other hand, the constant M is adjusted in accordance with an application when being actually output. This is because, in an extreme example, when M is extremely small, a phenomenon that numerical decryption becomes difficult later occurs. Actually, M basically has a characteristic that the larger M is, the more correct decryption becomes. On the other hand, in view of an aesthetic impression given to humans, M has a characteristic that, when M is extremely large, an appearance is spoiled by this pattern.

As illustrated in FIG. 4, in accordance with the above-described method, an initial point $P_{R0}$ is marked along a curved line from the origin 0 in the $T_R$ direction. A length of the curved line from the origin 0 to $P_{R0}$ in this case is $D_{R0}$. $D_{R0}$ is represented using an arbitrary numerical value $B_0$, and in terms of internal processing, $D_{R0}=MB_0$. On the other hand, similarly, in order to avoid a redundant expression, $D_{R0}$ is expressed simply as $D_{R0}=B_0$. Hereinafter, an entire blank portion at the center will be represented simply as B.

That is, the initial blank portion B in which a numerical value is not embedded on the curved line from the origin of the spiral line $S_R$ spreading from the origin 0 is output. Reasons for this is as follows.

Reason 1. Without the initial blank portion B, in a position close to the origin 0, a curvature of the spiral line in each of the forward direction, that is, the $T_R$ direction, and a normal direction is large, and therefore, decryption is actually difficult to perform.

Reason 2. Without the initial blank portion B, an appearance is spoiled. That is, a distortion of the spiral line in each of the forward direction, that is, the $T_R$ direction, and a normal direction appears large, and therefore, the entire appearance is spoiled.

Note that the initial blank portion B may not be necessarily provided.

From $P_{R0}$, $P_{R1}$, $P_{R2}$, $P_{R3}$, . . . , and $P_{Rn}$ are marked in the $T_R$ direction of the curved line. Respective lengths of curved lines from the origin 0 with respect to $P_{R1}$, $P_{R2}$, $P_{R3}$, . . . , and $P_{Rn}$ can be represented by $D_{R1}$, $D_{R2}$, $D_{R3}$, . . . , and $D_{Rn}$. At this time, the point $P_{Rn}$ is marked such that, when $D_{R1}=B_0+$A1 where n>0, $D_{Rn}=D_{Rn-1}+A_n$ is held. Also, using T, $T_{Rn}=D_{Rn}-B_0$ is given. In this case, as a matter of course, $T_{R0}=D_{R0}-B_0=B_0-B_0=0$.

With respect to the points $P_{R0}$, $P_{R1}$, $P_{R2}$, $P_{R3}$, . . . , and $P_{Rn}$, each curved line between $P_{Rn-1}$ and $P_{Rn}$ is represented as $C_{Rn}$ (n≥1 and n≤N). In this case, a length of $C_{Rn}$ is $A_{Rn}$. With respect to all of $C_{R1}$, $C_{R2}$, $C_{R3}$, . . . and $C_{Rn}$, points are marked at equal intervals in accordance with a specific division number Q to divide the curved line.

$C_{Rn}$ is expressed by the following expression.

$$C_{Rn} = \{C_{Rn(1)}, C_{Rn(2)}, C_{Rn(3)}, \ldots \text{ and } C_{Rn(Q)}\}$$

where $C_{Rn(m)}$ represents a position of a point obtained by equally dividing.

With respect to specific $C_{Rn}=\{C_{Rn(1)}, C_{Rn(2)}, C_{Rn(3)}, \ldots, C_{Rn(Q)}\}$, $C_{Rn}$ is moved in the normal direction using a specific moving system for all $C_{Rn(m)}$ (1≤n≤A) (1≤m≤Q). Examples of moving systems used for moving in the normal direction include a sine wave mode, a square wave mode, or the like. Herein, a case using the sine wave mode will be described. As a premise, a moving distance in the normal direction is a height d. As is evident from the description above, an actual dimension in the normal direction is Md, but for similar reason to that in the foregoing, description thereof will be omitted in the following description.

Of the moving systems used for moving in the normal direction, the sine wave mode is performed in accordance with the following procedures. For $C_{Rn(m)}$ ($1 \leq n \leq A$) ($1 \leq m \leq Q$), a height of a moving destination in the normal direction is represented as $N_{Rn(m)}$ when it is assumed that a height of $C_{Rn(m)}$ before moving is 0. At this time, a possible range of a value of $N_{Rn(m)}$ is ($-d \leq 0 \leq d$).

Regarding the normal direction, a direction outwardly away from a center point 0 is a + direction, and a direction inwardly approaching the center point 0 is a − direction. Accordingly, the phrase "the height was moved by d" means that the height was moved in the + direction by d, and the phrase "the height was moved by −d means that the height was moved in the − direction only by d.

For $C_{Rn}$, a normal height $N_{Rn(m)}$ with respect to all of divided curved lines $\{C_{Rn(1)}, C_{Rn(2)}, C_{Rn(3)}, \ldots, C_{Rn(S)}\}$ is determined in accordance with the following function.

$$N_{Rn(m)} = d \times \sin(2\pi \times (m-1) \div Q)$$

In this case, when the division number Q of the curved line has a certain magnitude with respect to an entire length of the curved line $C_{Rn}$ (for example, Q=64 or the like), as $C_{Rn}$, a smooth sine wave with a wave amplitude d and a wavelength $\lambda = A_n$ is drawn on the spiral line $S_R$.

Figure 5:
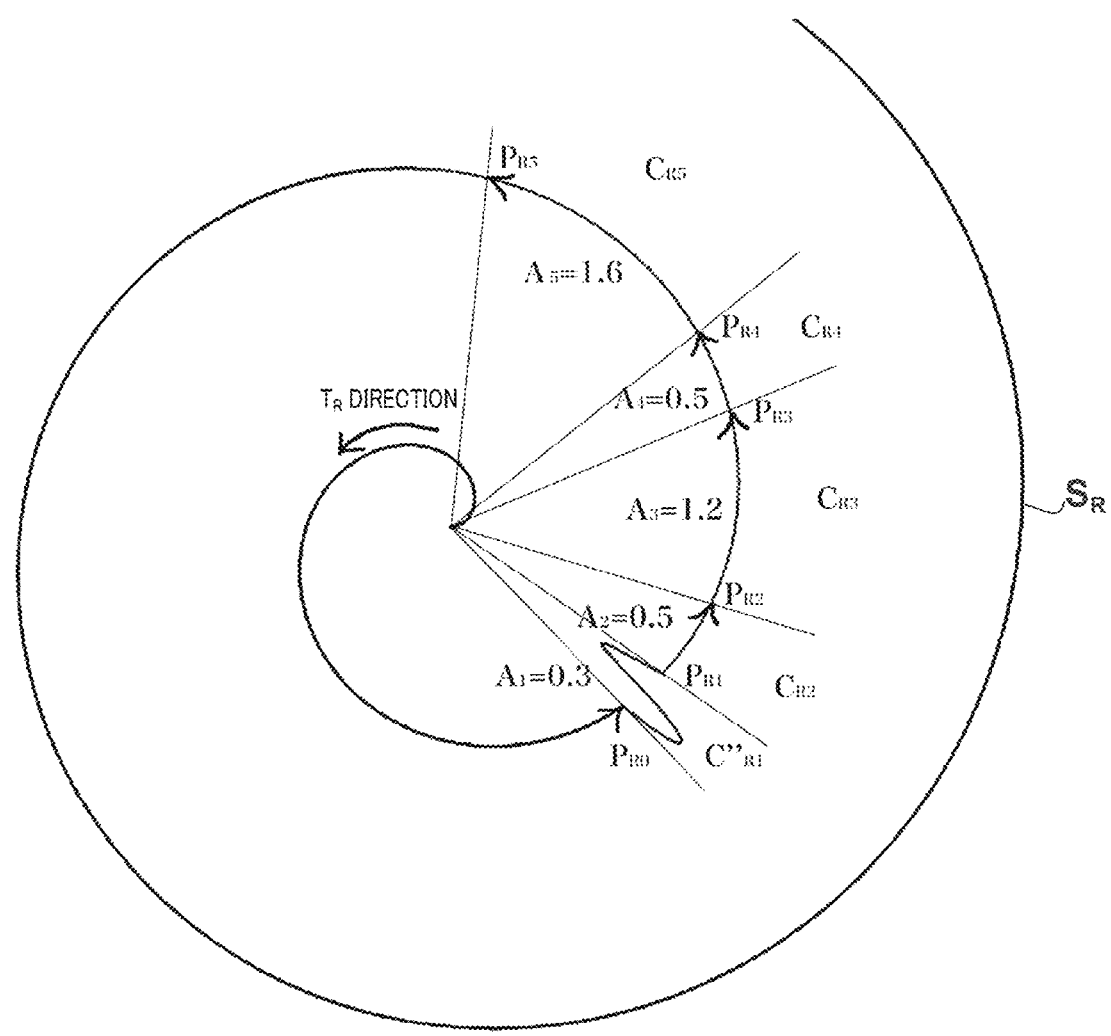
FIG. 5 is a diagram illustrating how an initial point $P_{R0}$ is marked along a curved line starting from an origin 0 in a $T_R$ direction.

When the above-described moving system is adapted to $C_{R1}$, a curved line to which the moving system has been adapted is represented by $C''_{R1}$ (see FIG. 5). A pattern is given simply for later decryption.

Figure 6:
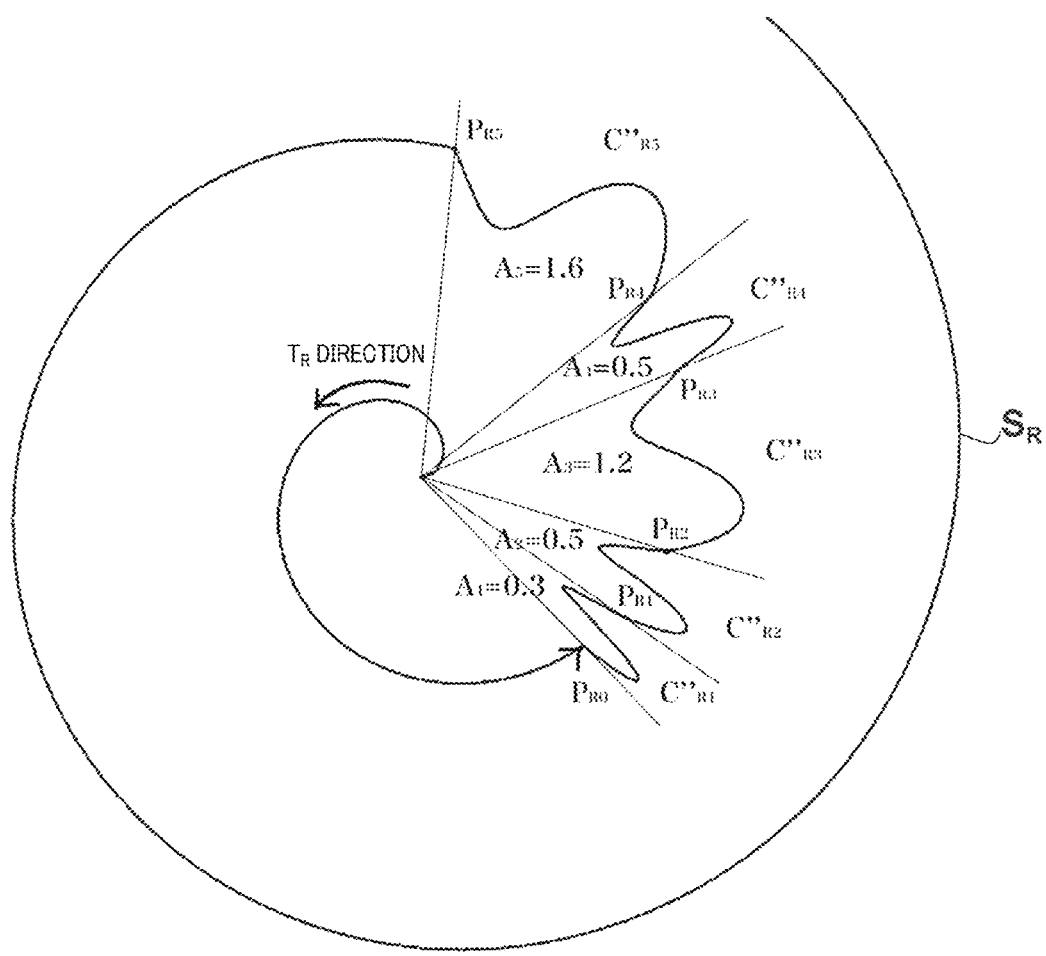
FIG. 6 is a diagram illustrating how $C_{Rn} \rightarrow C''_{Rn}$ conversion is performed on all $C_{Rn}$.

As illustrated in FIG. 6, regarding conversion performed as $C_{R1} \to C''_{R1}$, similarly, conversion of $C_{R1} \to C''_{R1}$ is performed on all $C_{Rn}$.

—Repeat Function—

A basis of a two-dimensional numeric code embedding technology has been described so far. Similar processing can be repeated in order to ensure accuracy in decryption by embedding a plurality of codes and give consideration to a design. A repeat number in this case is represented by P.

Although, in the above-described example, A={0.3, 0.5, 1.2, 0.5, 1.6}, the array is copied a number of times corresponding to the repeat number, and copied arrays are connected together. When arrays obtained by copying the number of times corresponding to the repeat number is represented by $A''_R$, a case where the repetition number P is 3 is expressed as follows.

A={0.3, 0.5, 1.2, 0.5, 1.6}, and P=3
A"R={0.3, 0.5, 1.2, 0.5, 1.6, 0.3, 0.5, 1.2, 0.5, 1.6, 0.3, 0.5, 1.2, 0.5, 1.6}

Similarly, the repeat number can be increased as much as desired. However, in final data output, there are limits of representation due to the screen size and resolution when a used medium is a screen, or a paper size and dpi of a printer when the medium is paper.

Figure 7A:
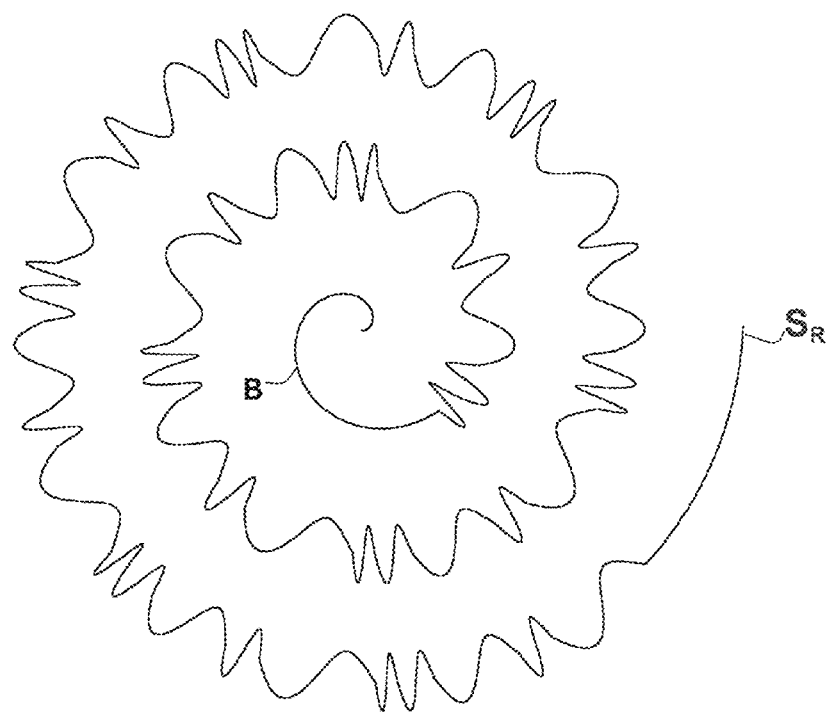
FIG. 7A is a diagram illustrating an output when P=10.
Figure 7B:
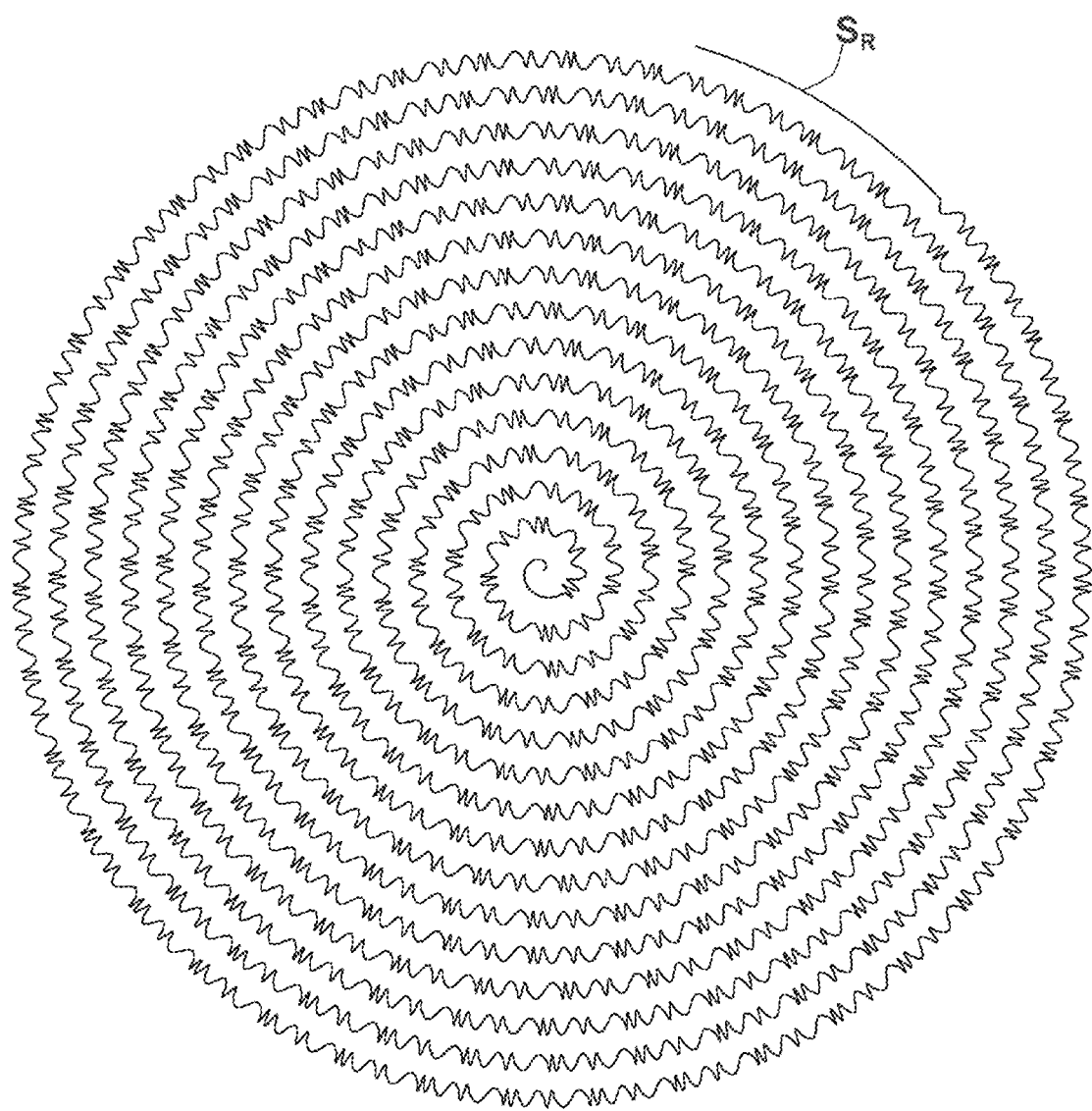
FIG. 7B is a diagram illustrating an output when P=300.

FIG. 7A illustrates an output when A={0.3, 0.5, 1.2, 0.5, 1.6}, and P=10, and FIG. 7B illustrates an output when A={0.3, 0.5, 1.2, 0.5, 1.6}, and P=300.

—Adaption of Spiral Line $S_L$ in Opposite Direction—

Figure 8A:
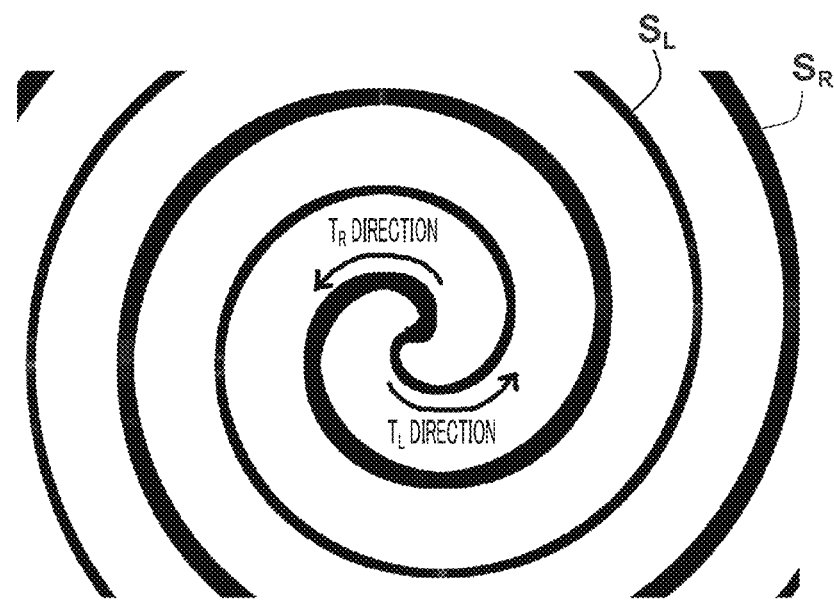
FIG. 8A is a diagram in which a bold line represents $S_R$ and a thin line represents $S_L$.

The spiral line $S_R$ in the $T_R$ direction has been adapted so far. Similarly, adaption of $S_L$ is performed. In FIG. 8A, a bold line represents $S_R$, and a thin line represents $S_L$.

Figure 8B:
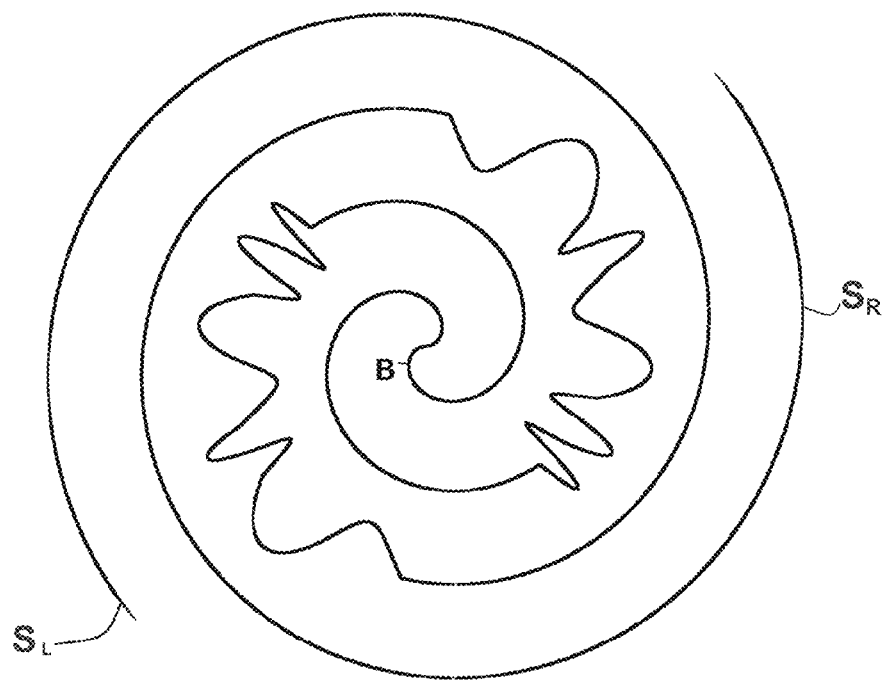
FIG. 8B is a diagram illustrating a case where a repetition number P=1.

In FIG. 8B, regarding $S_R$ and $S_L$, similar to a system for $S_R$ described above, A={0.3, 0.5, 1.2, 0.5, 1.6} is adapted to $S_L$ (when the repetition number P=1).

Figure 8C:
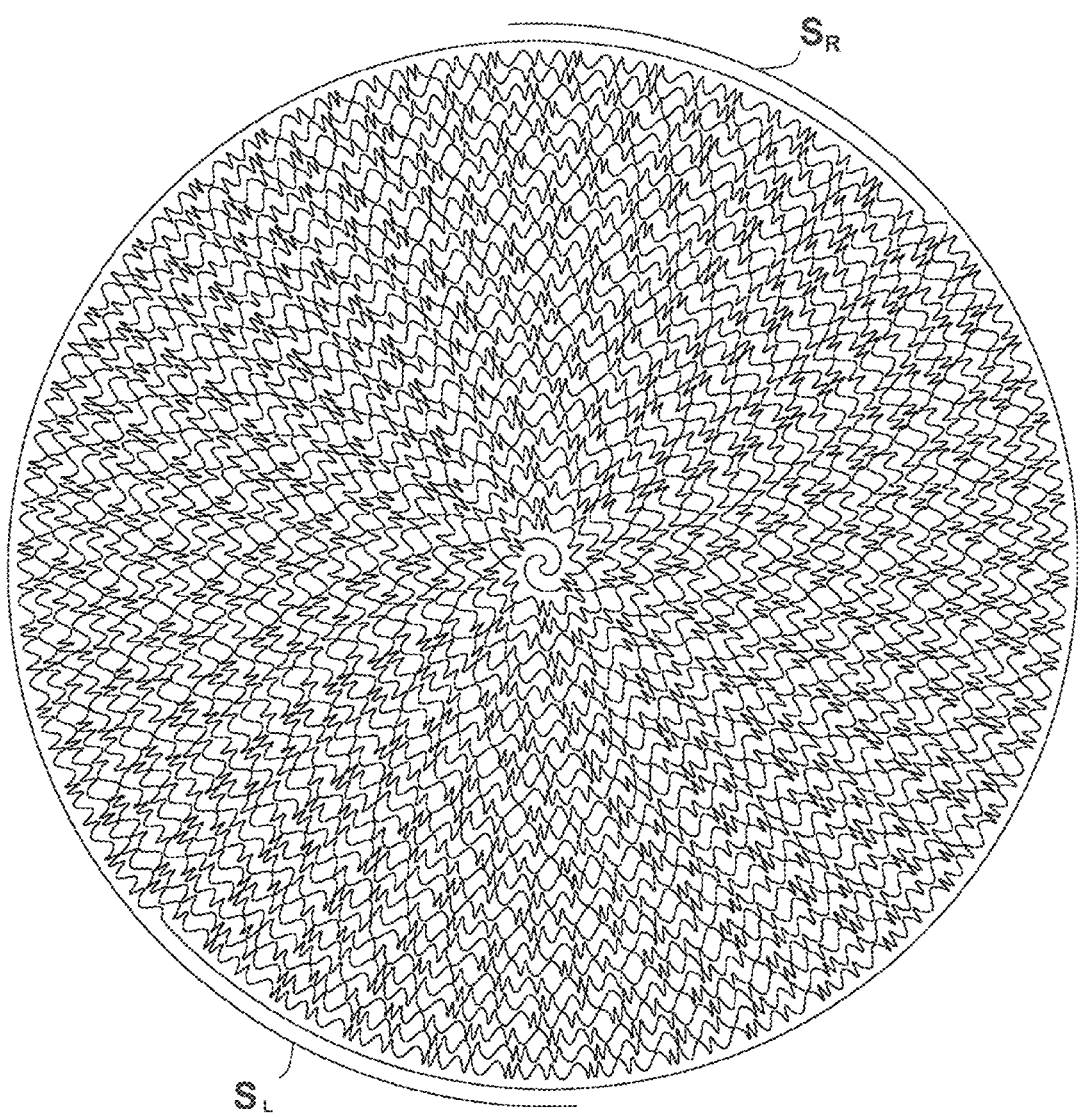
FIG. 8C is a diagram illustrating a case where the repetition number P=300.

When the repetition number P=300, an output illustrated in FIG. 8C is obtained.

Figure 8E:
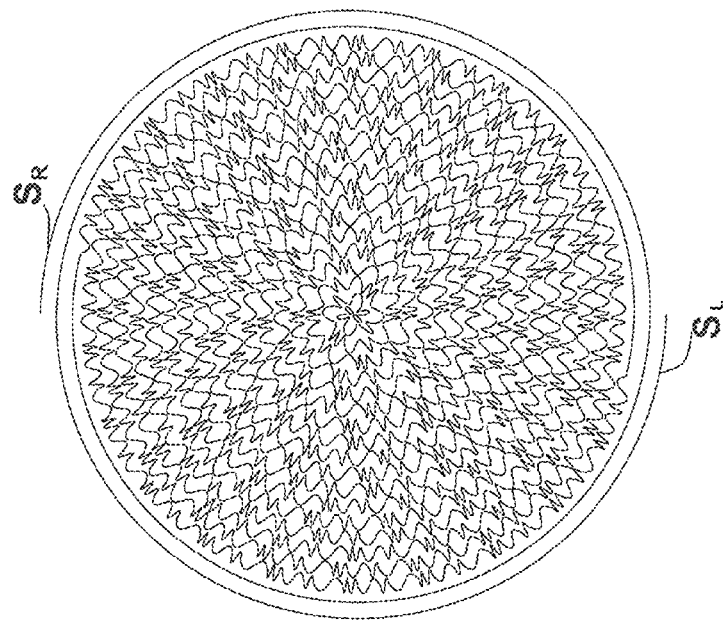
FIG. 8E is a diagram illustrating a case where the repetition number P=100 without a blank.
Figure 8D:
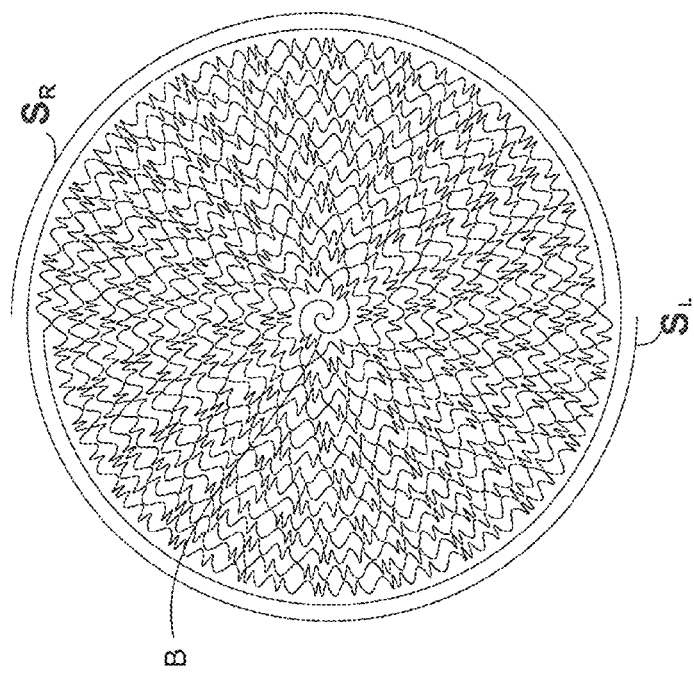
FIG. 8D is a diagram illustrating a case where the repetition number P=100 with a blank.

In FIGS. 8D and 8E, a difference in output between when there is the initial blank portion B (FIG. 8D) and when there is no initial blank portion B is illustrated (FIG. 8E). Assuming that the repetition number P=100, FIG. 8D illustrates a case where there is the initial blank portion B, and FIG. 8E illustrates a case where there is not the initial blank portion B. With the initial blank portion B, for the central portion in decrypting, with or without the initial blank portion B can be selected in order to make the initial blank portion B be easily found as a guide mark or make adjustment on appearance.

—Mode Setting in which + Direction and − Direction of Height of Normal Line are Reversed for $S_R$ and $S_L$—

A mode in which the + direction and the − direction of the height of the normal line are reversed for $S_R$ and $S_L$ can be arbitrarily set. When the + direction and the − direction of the height of the normal line are reversed, a spiral line that serves as a reference is represented by S, and a spiral line obtained by reversing the + direction and the − direction is represented as $S^{rev}$.

Similarly, for N, $N^{rev}$ is used. In this case, as described above, the height of the normal line is expressed by the following expression.

$$N_{n(m)} = d \times \sin(2\pi \times (m-1) \div Q)$$

In contrast to this, a mode in which normal line move is reversed is expressed by the following expression.

$$N^{rev}_{n(m)} = d \times \sin(-2\pi \times (m-1) \div Q)$$

Figure 9A:
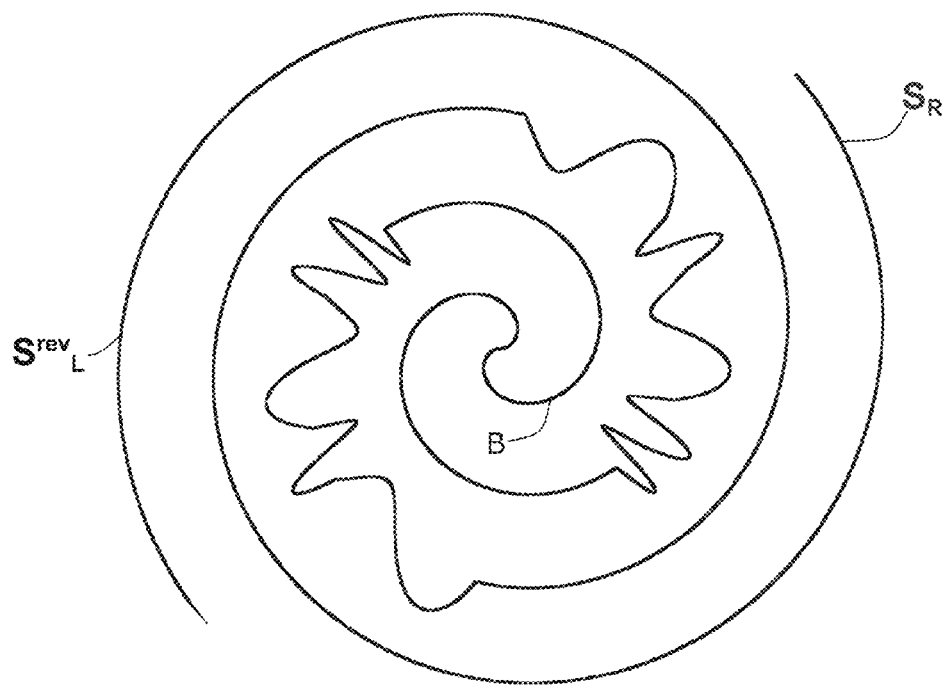
FIG. 9A is a diagram illustrating an output in which $S_R$ and $S^{rev}_L$ are combined.

For example, as illustrated in FIG. 9A, an output obtained by combining $S_R$ and $S^{rev}_L$ is made. In this case, for $S_R$, move of $0 \to +d \to 0 \to -d \to 0$ is made from $N_{Rn(1)}$ to $N_{Rn(S)}$, and for $S^{rev}_L$ move of $0 \to -d \to 0 \to +d \to 0$ is made from $N^{rev}_{Ln(1)}$ to $N^{rev}_{Ln(S)}$.

Figure 9B:
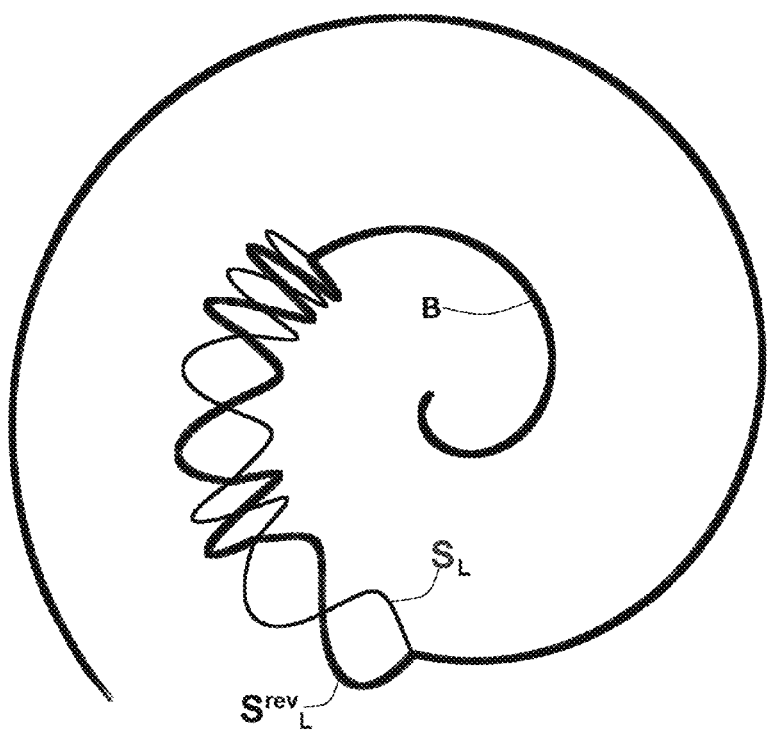
FIG. 9B is diagram illustrating $S_R$ and $S^{rev}_L$ superimposed in order to illustrate change in a manner easily understood.

In order to illustrate change in a manner easily understood, $S_L$ and $S^{rev}_L$ are superimposed as illustrated in FIG. 9B. In FIG. 9B, a thin line represents $S_L$, and a bold line represents $S^{rev}_L$.

Figure 9C:
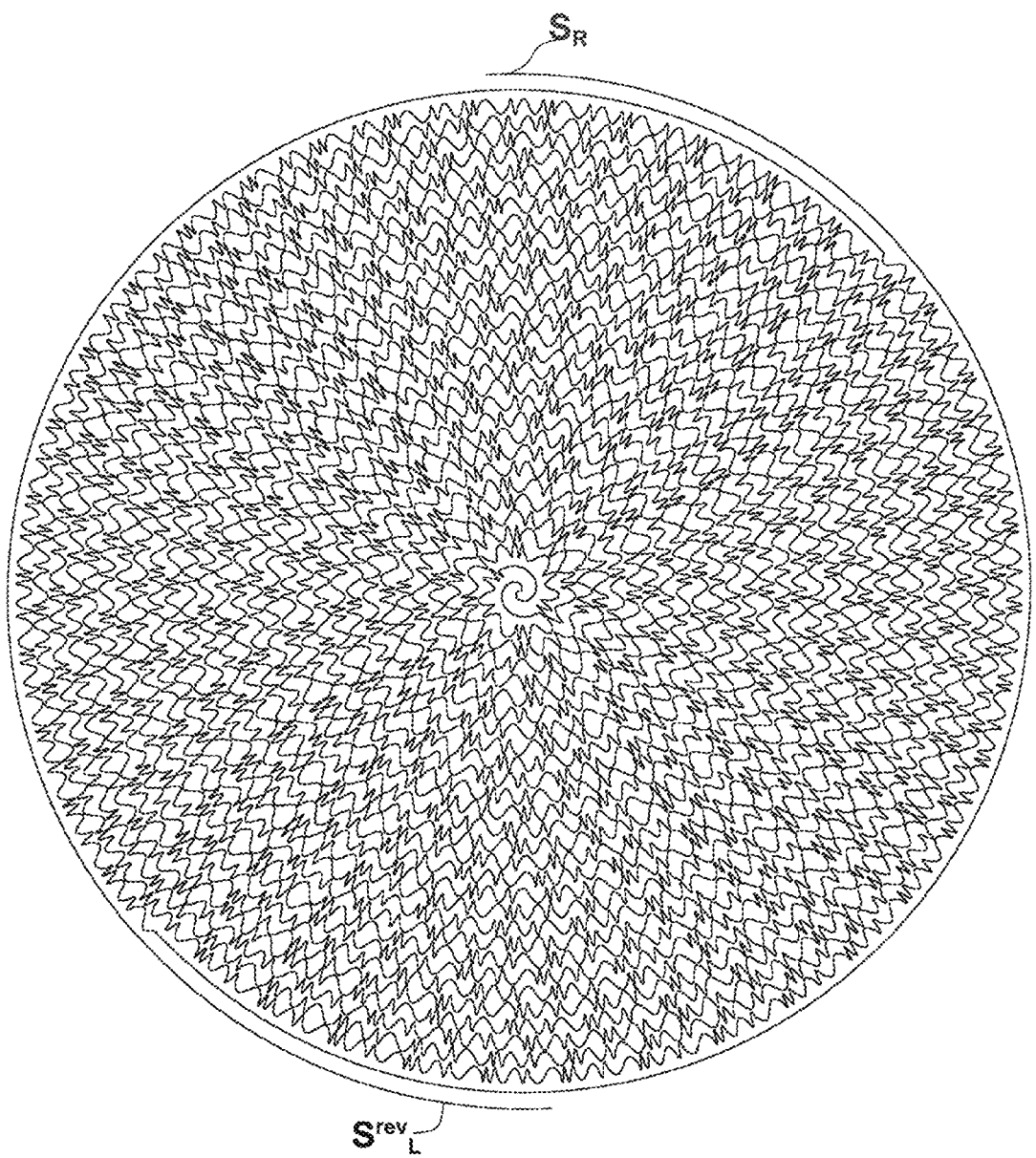
FIG. 9C is a diagram illustrating a case where the repetition number P=300.

When S is output with respect to A={0.3, 0.5, 1.2, 0.5, 1.6}, S is output as $S_R$ and $S^{rev}_L$ and an example where P=300 is as illustrated in FIG. 9C.

—Summary of Method for Generating Spiral Line S—

To summarize what has been described above, as a method for generating the spiral line S, generation of the following four patterns (i.e., predetermined direction patterns) is possible.

$S_R$, $S_L$
$S_R$, $S^{rev}_L$
$S^{rev}_R$, $S_L$
$S^{rev}_R$, $S^{rev}_L$

A reason why the above-described reversed patterns are generated too is that, when a plurality of modes can be set, a different mode can be excluded by designating a mode in decrypting. Another reason is to increase the security level. In a setting in accordance with an aesthetic viewpoint, the appearance is changed.

Figures 1, 10A:
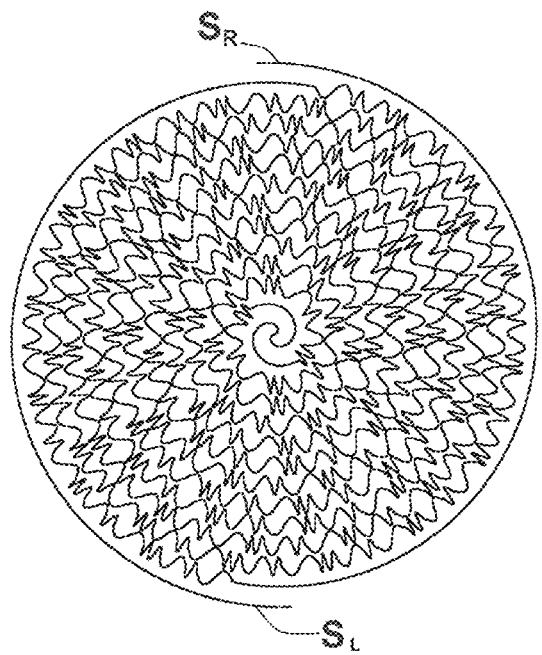
Figures 2, 10A:
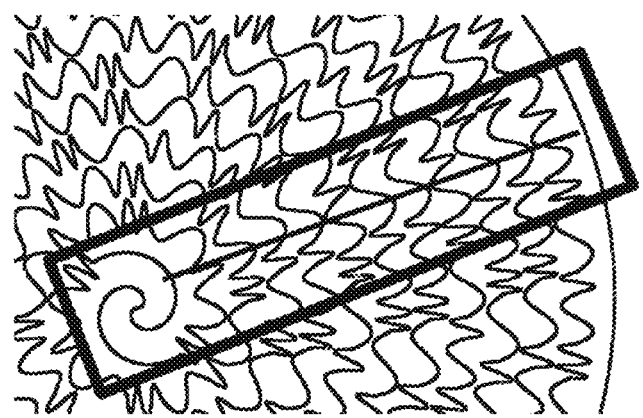
Figures 1, 10B:
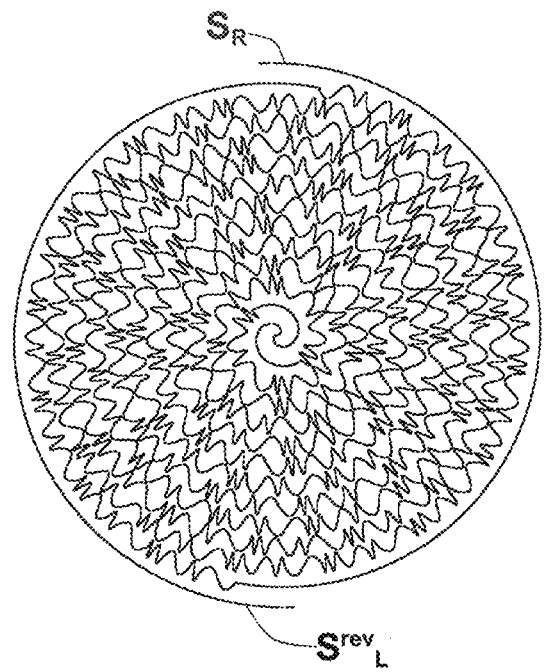
Figures 2, 10B:
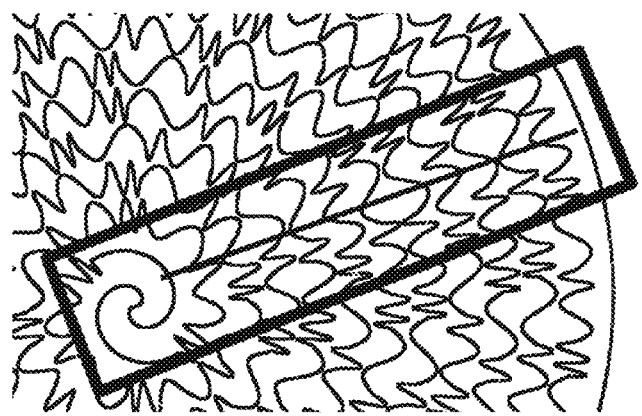

Assuming A={0.3, 0.5, 1.2, 0.5, 1.6} and P=50, FIG. 10A-1 illustrates an example where S is output as $S_R$ and $S_L$, and FIG. 10A-2 is a diagram where a portion of the same output as that in FIG. 10A-1 is enlarged to draw attention. FIG. 10B-1 illustrates an example where S is output as $S_R$ and $S^{rev}_L$ and FIG. 10B-2 is a diagram where a portion of the same output as that in FIG. 10B-1 is enlarged to draw attention.

A consequence of the above-described difference in mode does not affect encryption and decryption. This mode is given mainly for a purpose of distinguishing visual effects.

For example, in each of FIG. 10A-2 and FIG. 10B-2, a focus is put on the same position, and the same line is drawn. By drawing a line in this manner, a difference in impression can be easily understood. When recognizing the same pattern, human vision collectively perceives objects with the same pattern. In this example, specifically, since P=50, as for $S_R$ and $S_L$ illustrated in FIG. 10A-1 and FIG. 10A-2, succession of the same patterns is arranged in a spiral line shape, and therefore, visual psychologically, it is understood that each of $S_R$ and $S_L$ is visually recognized to have outward directivity from the center or inward directivity. A person seeing $S_R$ and $S_L$ is likely to have an impression that the person is drawn toward the center or is expelled.

On the other hand, as for $S_R$ and $S^{rev}_L$ in FIG. 10B-1 and FIG. 10B-2, outward directivity from a central portion or inward directivity is cancelled, and therefore, a person seeing $S_R$ and $S^{rev}_L$ is given an impression that the person is drawn toward the center or is expelled.

Figures 2, 10C:
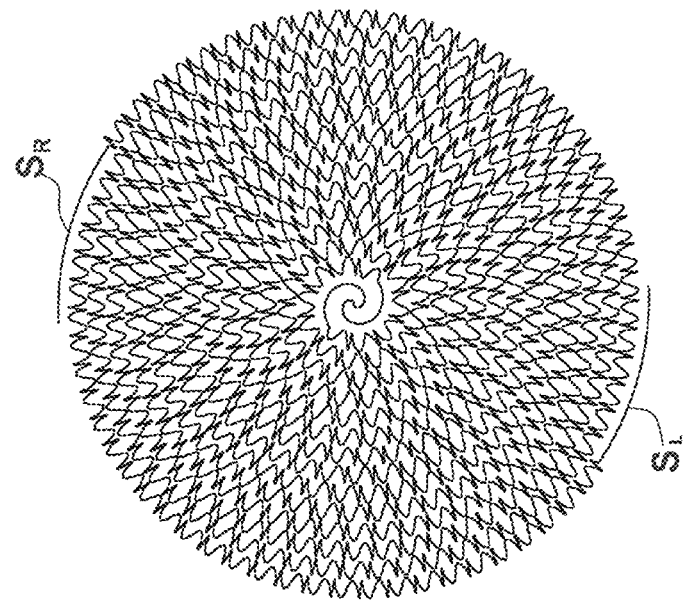
Figures 1, 10C:
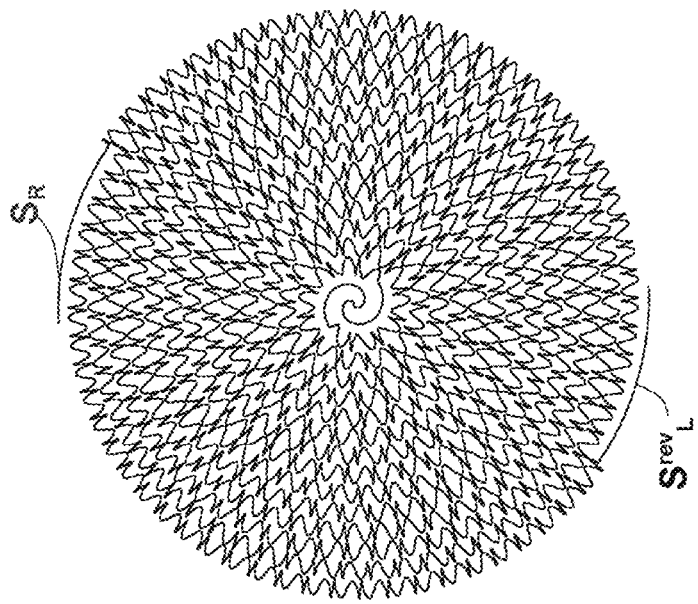

FIG. 10C-1 and FIG. 10C-2 more clearly illustrate the directivities described above. A case where A"={1.0, 0.25, 1.0, 0.25, . . . (snip) . . . , 1.0, 0.25} and {1.0, 0.25} are repeated is a case most easily understood, and the above-described state can be visually recognized.

FIG. 10C-1 illustrates a case of {1.0, 0.25}, P=250, and $S_R$ and $S_L$, and FIG. 10C-2 illustrates a case of {1.0, 0.25}, P=250, and $S_R$ and $S^{rev}_L$.

This example is a clear sample of "a long wave" and "a short wave" and, with the illustrated shapes, a difference in mode is most significantly observed. As with a combination of $S_R$ and $S_L$, when directions of spiral lines are set the same, directivity as a whole appears, whereas, with a combination of $S_R$ and $S^{rev}_L$ directivity as a whole is cancelled. That is, it can be considered that an effect of relaxing a state where a person "feels dizzy" is achieved in a sense.

On the other hand, when all elements of A" have the same numerical value, that is, in other words, specifically, when a signal generated from A is a periodic signal, this difference is not observed if the signal is completely a periodic signal. This can be considered because the difference cannot be visually recognized from appearance even when a phase of a wave of the periodic signal is reversed.

Figures 2, 10D:
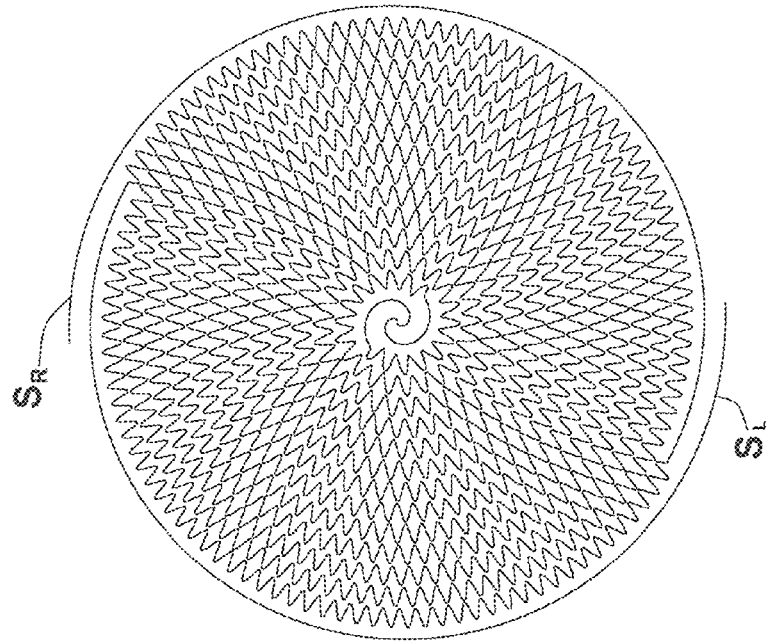
Figures 1, 10D:
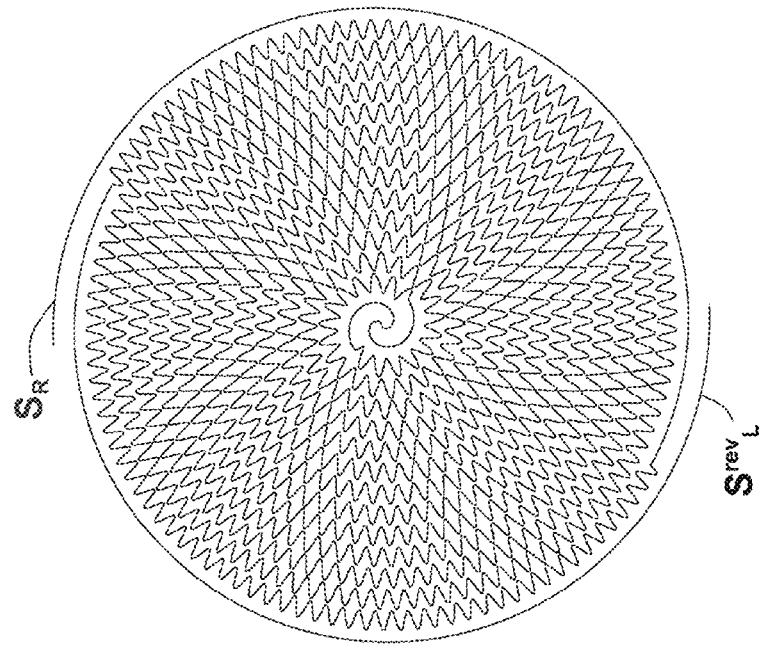

FIG. 10D-1 illustrates $S_R$ and $S_L$, and FIG. 10D-2 illustrates $S_R$ and $S^{rev}_L$. In general, A is data that generates a non-periodic continuous signal. When the number of elements of A is 1 or when all of the elements of A have the same numerical value, a periodic signal is generated as a result.

—Output of Various Patterns Depending on Setting (No. 1: Comparison in Terms of Magnitude of M)—

Figure 11A:
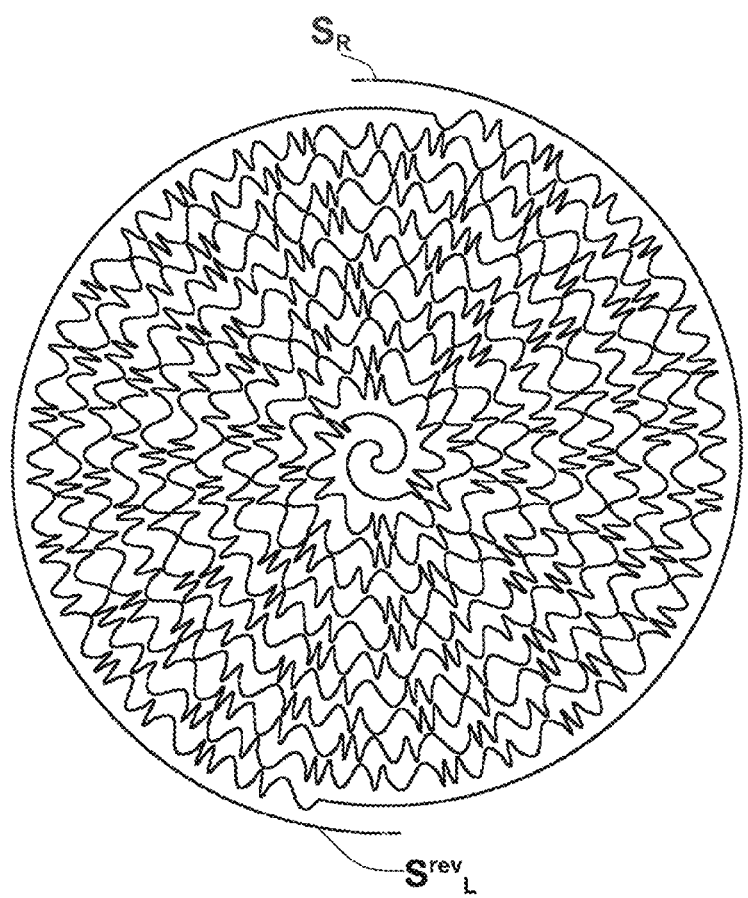
FIG. 11A is a diagram illustrating an output with $S_R$ and $S^{rev}_L$ when M is a reference value M=M1.

FIG. 11A illustrates an output with $S_R$ and $S^{rev}_L$ when A={0.3, 0.5, 1.2, 0.5, 1.6}, P=50, and M is a reference value M=M1.

Figure 11B:
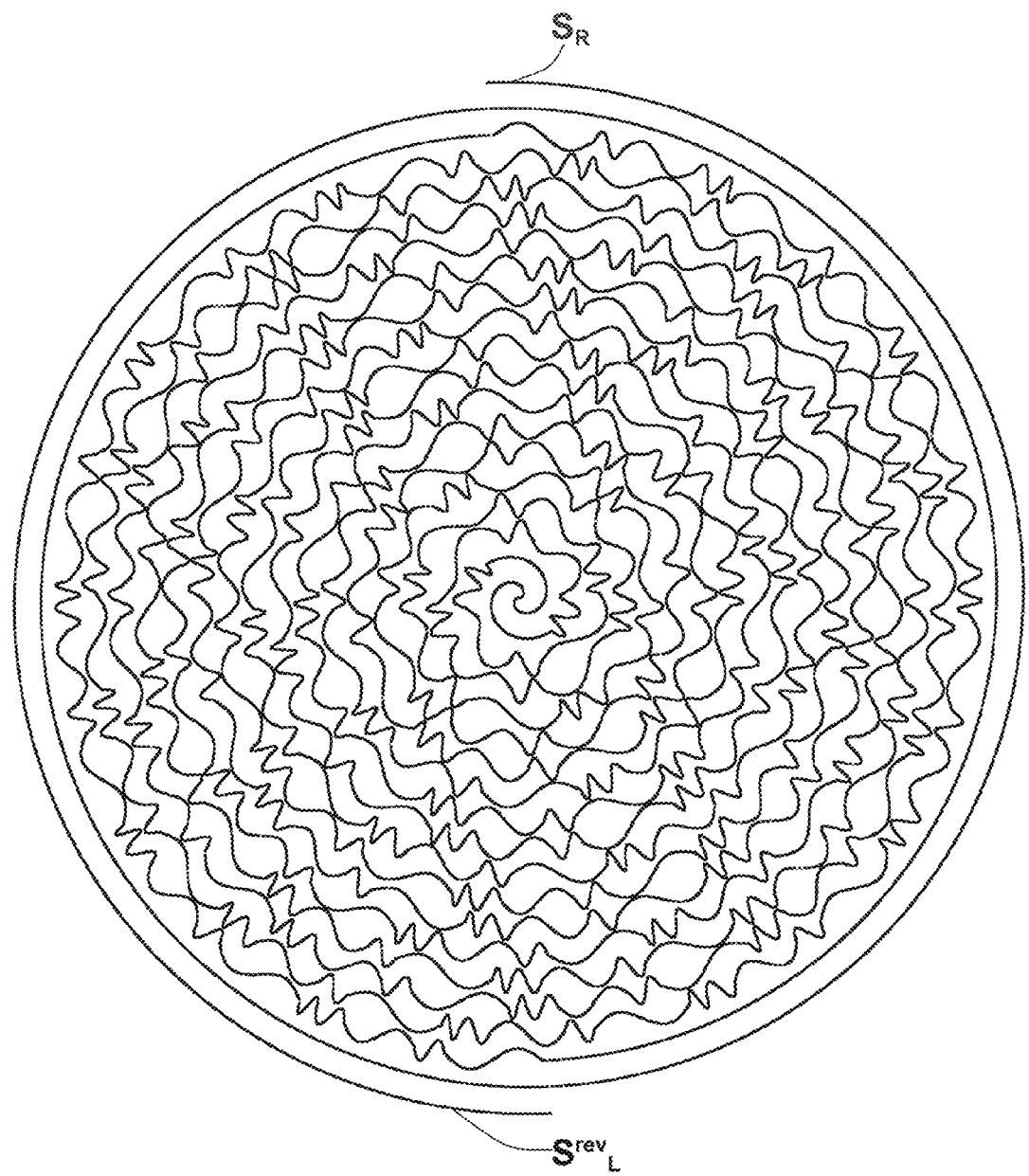
FIG. 11B is a diagram illustrating an output with $S_R$ and $S^{rev}_L$ when M=2×M1.

FIG. 11B illustrates an output with $S_R$ and $S^{rev}_L$ when A={0.3, 0.5, 1.2, 0.5, 1.6}, P=50, and M=2×M1.

Figure 11C:
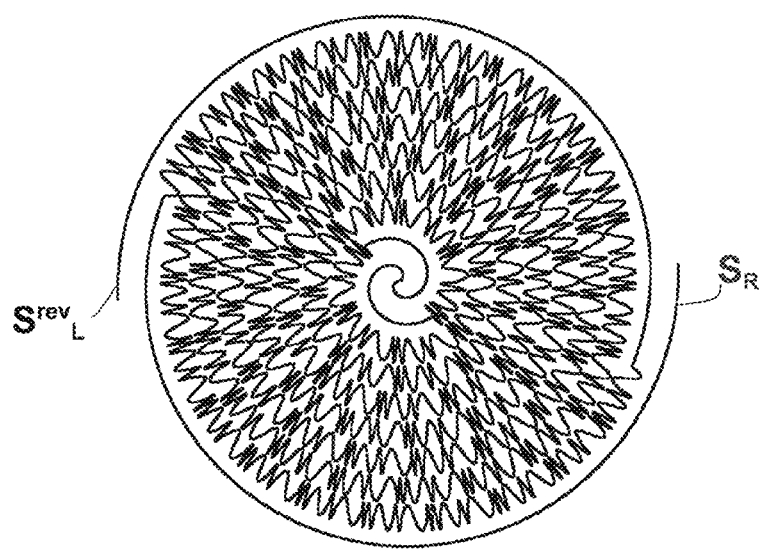
FIG. 11C is a diagram illustrating an output with $S_R$ and $S^{rev}_L$ when M=0.5×M1.

FIG. 11C illustrates an output with $S_R$ and $S^{rev}_L$ when A={0.3, 0.5, 1.2, 0.5, 1.6}, P=50, and M=0.5×M1.

—Output of Various Patterns Depending on Setting (No. 2: Comparison in Terms of Magnitude of d)—

Figure 12A:
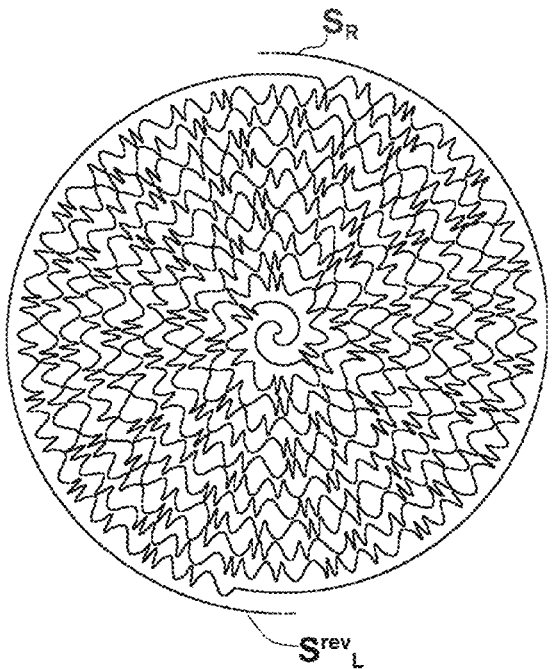
FIG. 12A is a diagram illustrating an output with $S_R$ and $S^{rev}_L$ when d is a reference value d=d1.

FIG. 12A illustrates an output with $S_R$ and $S^{rev}_L$ when A={0.3, 0.5, 1.2, 0.5, 1.6}, P=50, and d is a reference value d=d1.

Figure 12B:
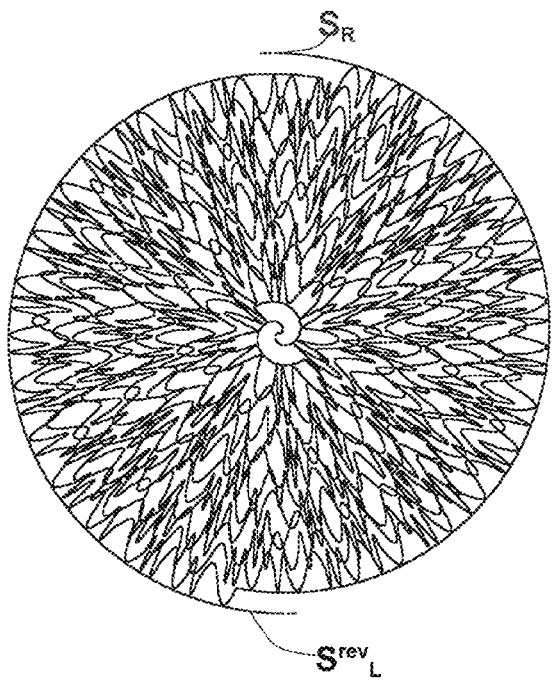
FIG. 12B is a diagram illustrating an output with $S_R$ and $S^{rev}_L$ when d=2×d1.

FIG. 12B illustrates an output with $S_R$ and $S^{rev}_L$ when A={0.3, 0.5, 1.2, 0.5, 1.6}, P=50, and d=2×d1.

Figure 12C:
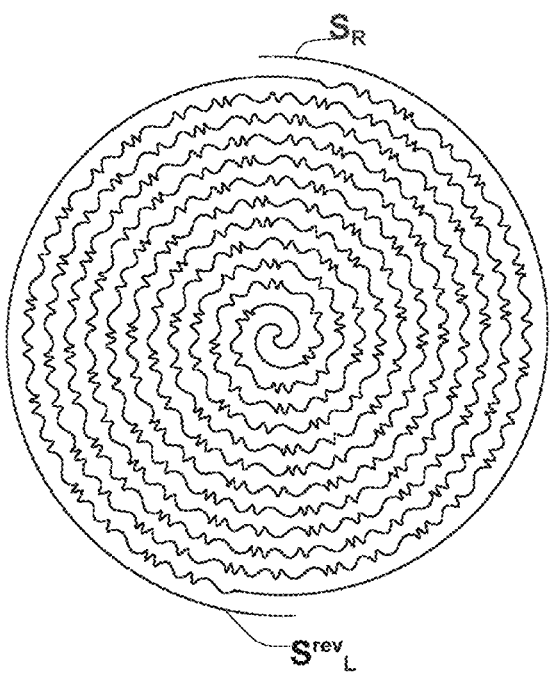
FIG. 12C is a diagram illustrating an output with $S_R$ and $S^{rev}_L$ when d=0.5×d1.

In this case, patterns are superimposed, and therefore, decryption is difficult. On the other hand, the decryption technology is more complicated, and therefore, there is an advantage that an encryption strength is increased FIG. 12C illustrates an output with $S_R$ and $S^{rev}_L$ when A={0.3, 0.5, 1.2, 0.5, 1.6}, P=50, and d=0.5×d1.

—Output of Various Patterns Depending on Setting (No. 3: Examples of High-Quality Pattern (with Large Division Number Q) and Low-Quality Pattern (with Small Division Number Q))—

Figure 13A:
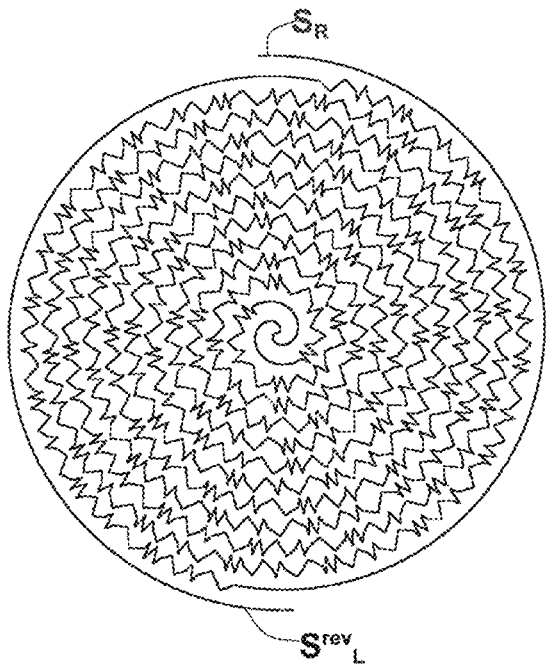
FIG. 13A is a diagram illustrating an output with $S_R$ and $S^{rev}_L$ when a division number Q=3.

FIG. 13A illustrates an output with $S_R$ and $S^{rev}_L$ when A={0.3, 0.5, 1.2, 0.5, 1.6}, P=50, and Q=3.

Figure 13B:
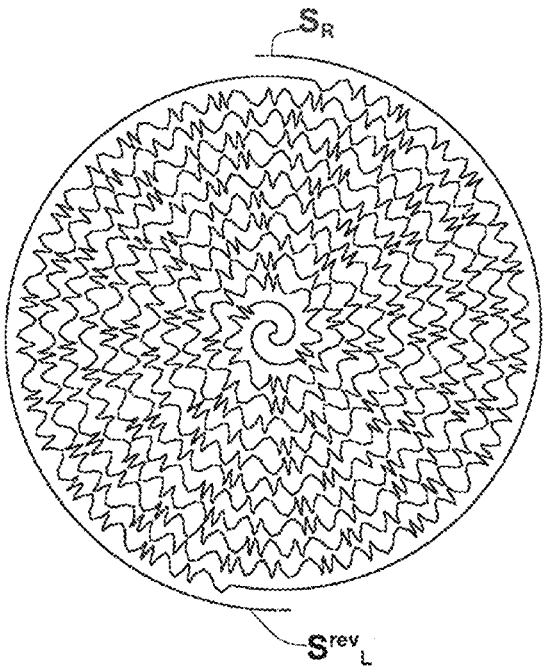
FIG. 13B is a diagram illustrating an output with $S_R$ and $S^{rev}_L$ when Q=5.

FIG. 13B illustrates an output with $S_R$ and $S^{rev}_L$ when A={0.3, 0.5, 1.2, 0.5, 1.6}, P=50, and Q=5.

Figure 13C:
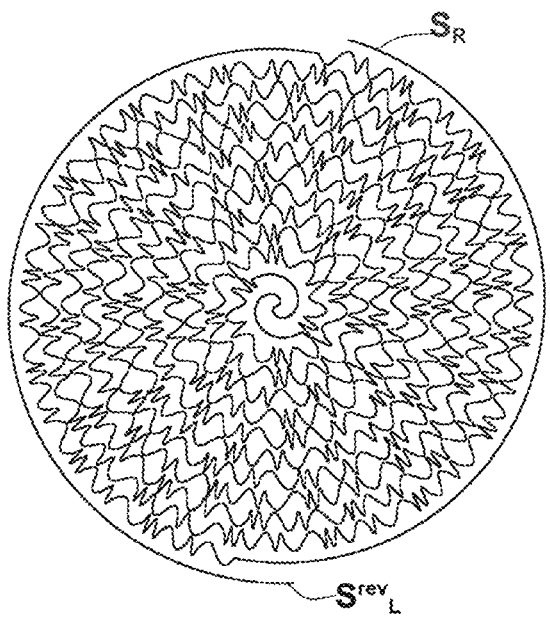
FIG. 13C is a diagram illustrating an output with $S_R$ and $S^{rev}_L$ when Q=16.

FIG. 13C illustrates an output with $S_R$ and $S^{rev}_L$ when A={0.3, 0.5, 1.2, 0.5, 1.6}, P=50, and Q=16.

Theoretically, in order to ensure accuracy of a guide mark in decrypting, a magnitude of the division number Q is preferably large. This is a setting related to the aesthetic viewpoint for smooth curved line representation. It is desired that the division number Q is more properly set in accordance with a type of paper used for outputting and a resolution of an image that is to be output. When the division number Q is increased too much, a large operation resource for figures is only needed, and therefore, setting the division number Q to a very large number affects a behavior of a device. It is preferable to set the division number Q in accordance with an application.

—Output of Various Patterns Depending on Setting (Sine Wave Representation and Square Wave Representation)—

Figure 14A:
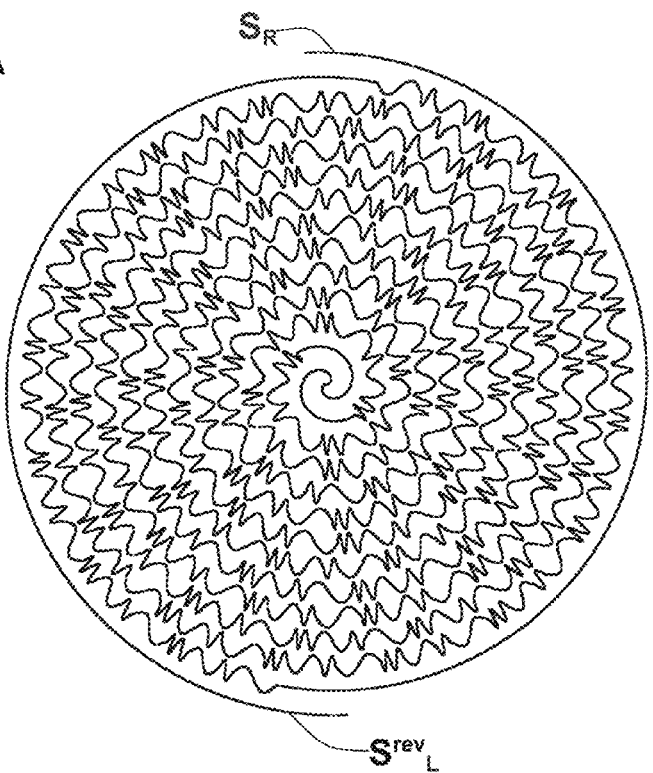
FIG. 14A is a diagram illustrating an output with $S_R$ and $S^{rev}_L$ in sine wave representation.

FIG. 14A illustrates an output with $S_R$ and $S^{rev}_L$ when A={0.3, 0.5, 1.2, 0.5, 1.6}, P=50, and sine wave representation is used. This is the same pattern as that in the description above.

Figure 14B:
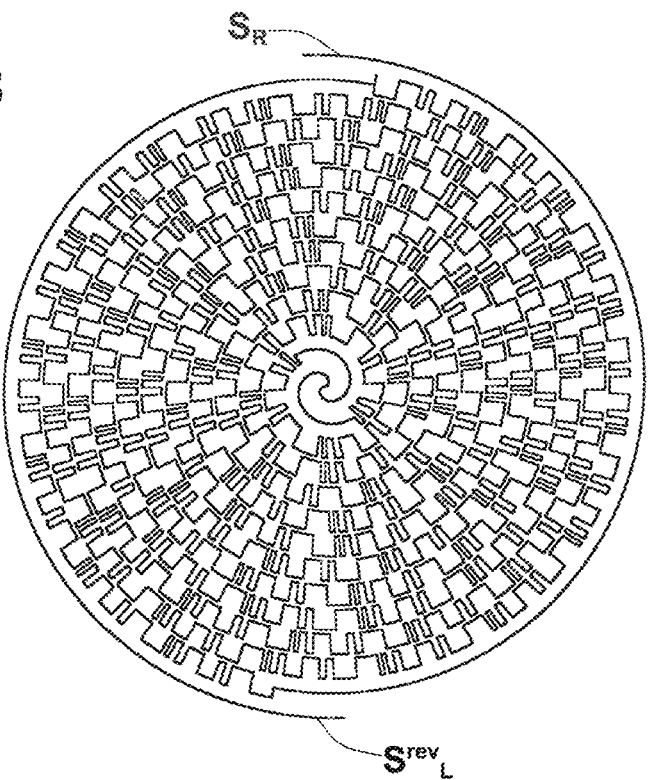
FIG. 14B is a diagram illustrating an output with $S_R$ and $S^{rev}_L$ in a square wave representation.

FIG. 14B illustrates an output with $S_R$ and $S^{rev}_L$ when A={0.3, 0.5, 1.2, 0.5, 1.6}, P=50, and a square wave representation is used.

Figure 14C:
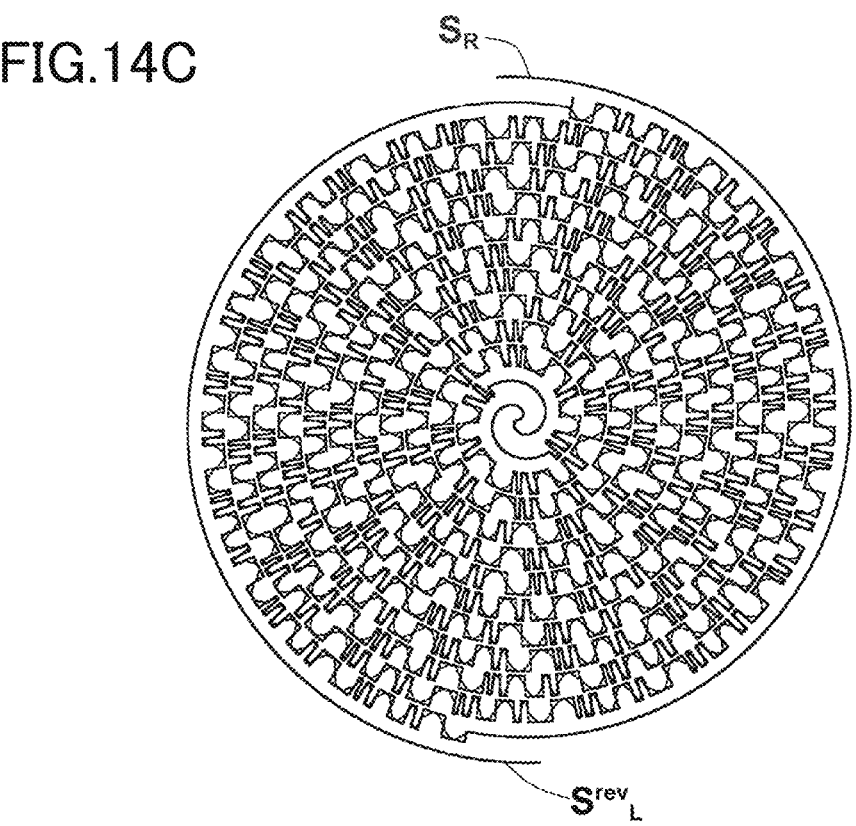
FIG. 14C is a diagram illustrating a case where the sine wave representation and the square wave representation are superimposed and $S_R$ and $S^{rev}_L$ are output.

For description, FIG. 14C illustrates an output with $S_R$ and $S^{rev}_L$ when A={0.3, 0.5, 1.2, 0.5, 1.6}, P=50, and the sine wave representation and the square wave representation are superimposed.

—Output of Various Patterns Depending on Setting (Example of Output of Relatively Large Pattern)—

Figure 15:
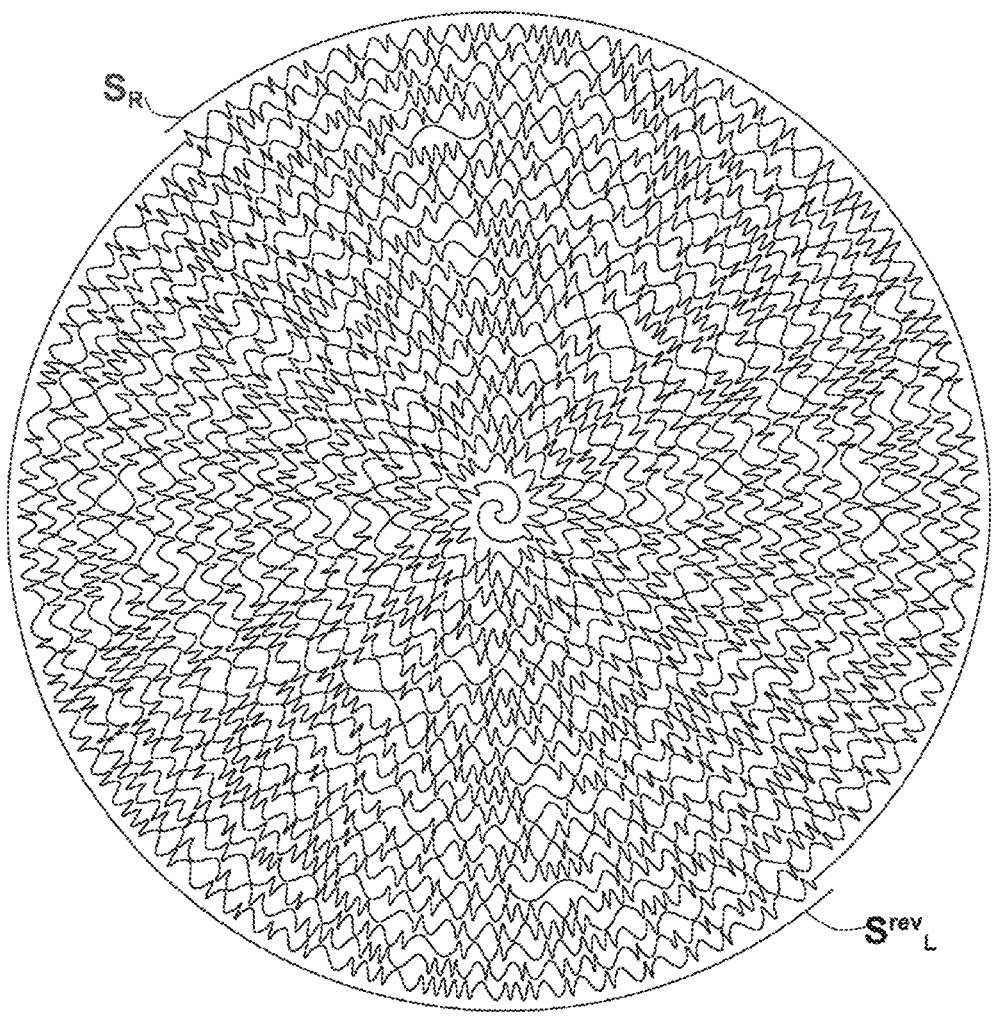
FIG. 15 is a diagram illustrating a large pattern when a number of elements of A is 1000.

For a large pattern in which the number of elements of A is 1000, FIG. 15 illustrates an output with $S_R$ and $S^{rev}_L$ when A={0.45, 0.35, 0.7, 0.35, 0.85, 0.2, 0.95, 0.3, 0.4, . . . (snip) . . . , 0.3, 0.45, 0.35, 0.85, 0.3, 1, 0.3, 1, 0.2, 1.2, 0.3, 0.95, 0.2, 1.25, 0.4, 1.2, 0.3}, P=1, and a sine wave representation is used. As for A, 1000 arrays of numerical values are arranged, and values in middle part are omitted.

—Description of Operation Screen of Software by Program According to Embodiment of The Present Disclosure—

Figure 16A:
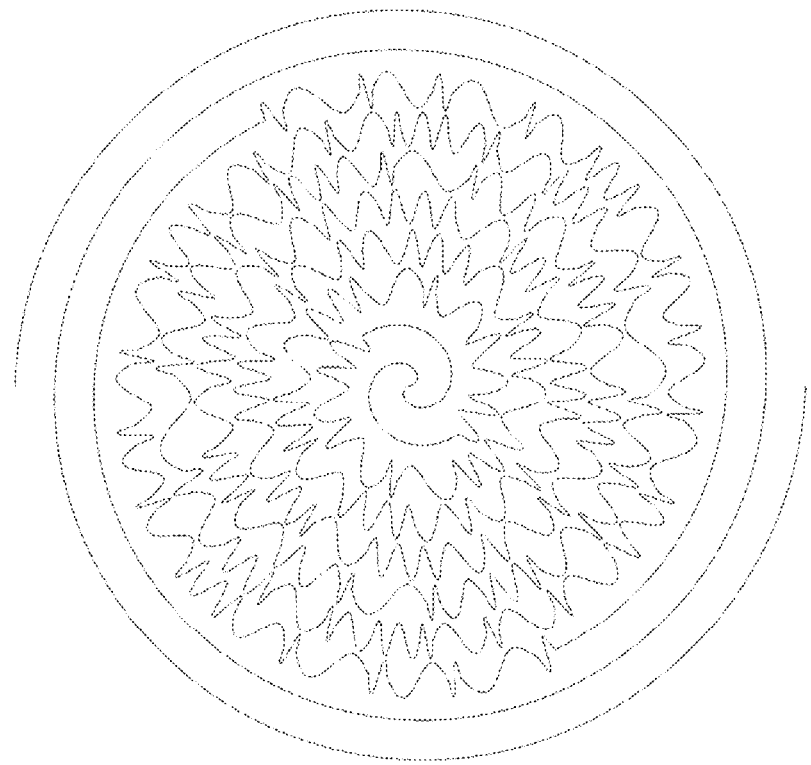
FIG. 16A is a diagram illustrating a basic figure of software.

All of the outputs of FIG. 11A to FIG. 15 described above are output by a dedicated software including a program according to the present disclosure. A figure illustrated in FIG. 16A will be described as a basic figure below.

Figure 16B:
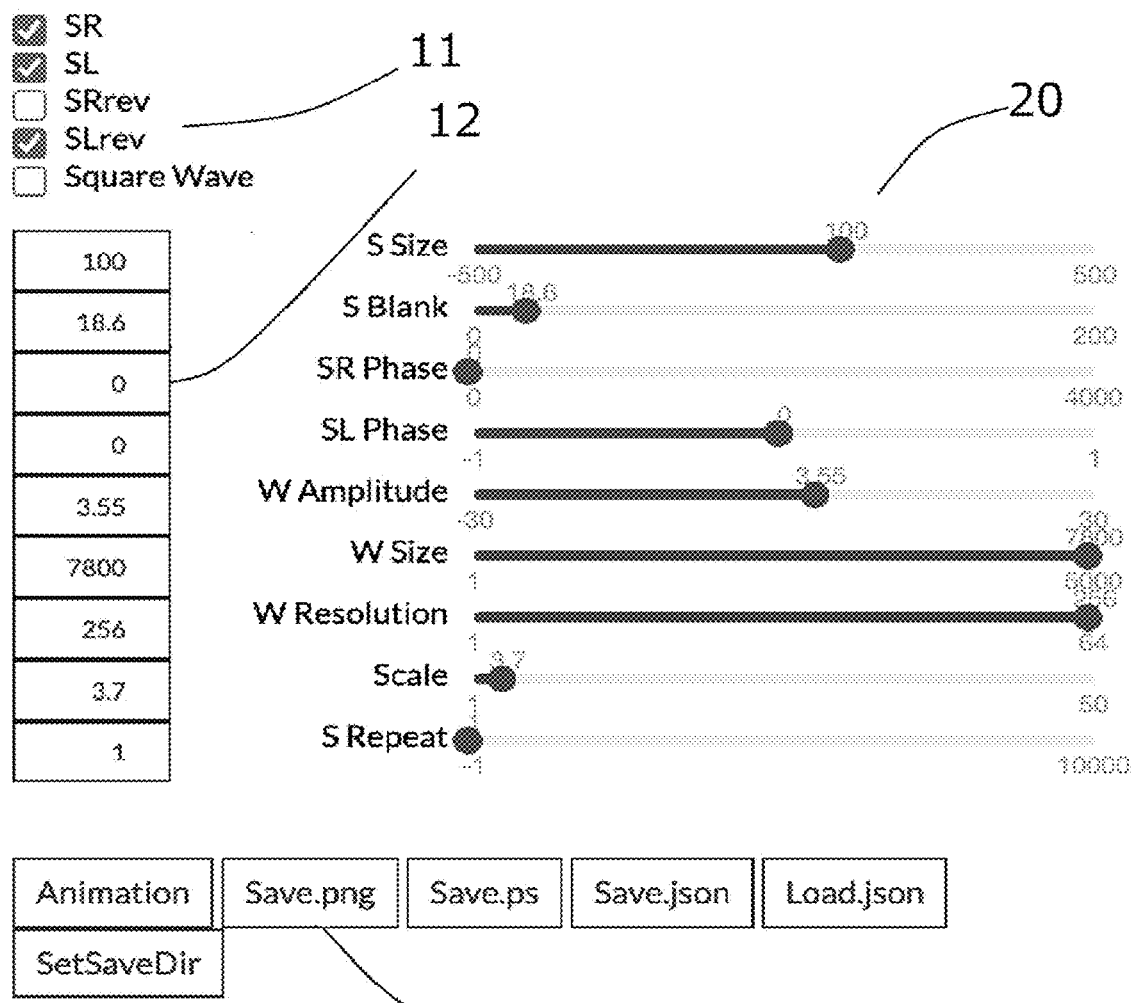
FIG. 16B is a diagram illustrating a user interface corresponding to the diagram shown in FIG. 16A.

The dedicated software includes a user interface 20 at left and, as enlarged and illustrated in FIG. 16B, the user interface 20 includes a check box section 11, a slider-and-numerical-value-input section 12, and a button section 13. In response to a result of setting on the user interface 20, an actual rendering output is displayed at center. Note that, in the software of this embodiment, an arithmetic operation is performed at a timing at which a numerical value or the like on the interface is changed, and therefore, a time lag occurs until a center preview is displayed. The software includes a function of previewing an output image and writing while operating each value via the user interface 20.

—Description of User Interface 20—

<Check Box Section 11>

Items in the check box section 11 will be described in order from top.

[SR]

Setting can be switched such that $S_R$ in S is output when [SR] is turned on and $S_R$ is not output when [SR] is turned off.

[SL]

Setting can be switched such that $S_L$ in S is output when [SL] is turned on and $S_L$ is not output when [SL] is turned off.

[SRrev]

$S_R$ in S is output as $S^{rev}_R$ when [SRrev] is turned on. $S_R$ is output as $S_R$ when [SRrev] is turned off. On and off of output itself can be switched by [SR], and switching between $S_R$ and $S^{rev}_R$ only can be performed by this check box.

[SLrev]

Similar to an SRrev button described above, this is for setting for $S_L$. $S_L$ and $S^{rev}_L$ can be switched by this check box.

[Square Wave]

Figures 1, 17:
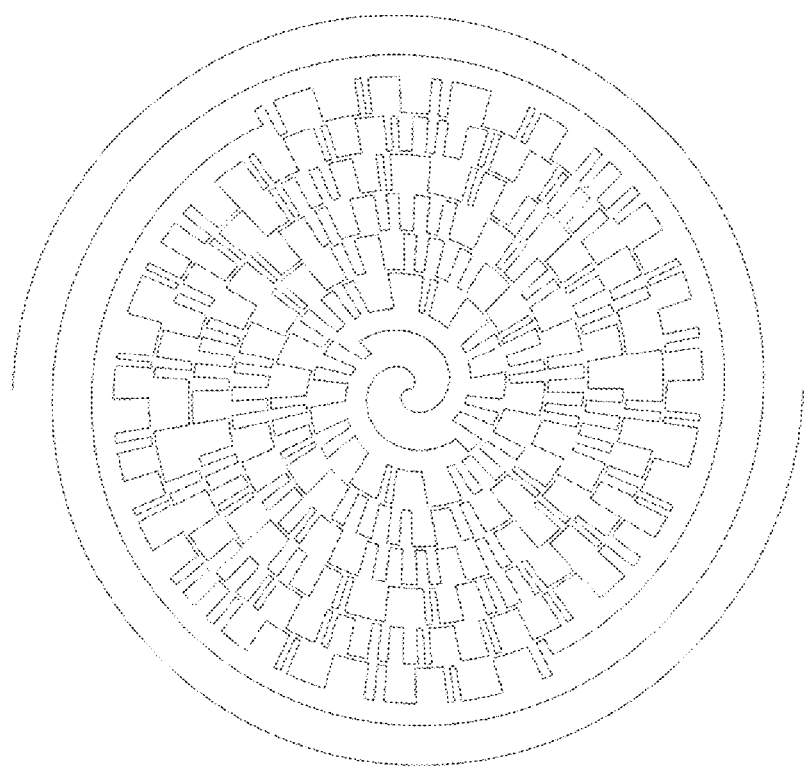
Figures 2, 17:

When [Square Wave] is turned on, a waveform mode is turned to a square wave. When [Square Wave] is turned off, the waveform mode is turned to a sine wave. FIG. 17-1 illustrates a case where only [Square Wave] is turned on with a basic figure setting kept, and FIG. 17-2 is a diagram illustrating a user interface corresponding to the diagram shown in FIG. 17-1. <Slider-and-numerical-value-input Section 12>

Items in the slider-and-numerical-value-input section 12 will be described in order from top.

[S Size]

A size of an entire portion of an "Archimedes spiral line" (or an involute curve) in an entire S can be changed. An example where a value of [S Size] is changed based on another value of the basic figure illustrated in FIG. 16A will be described below.

Figures 1, 18A:
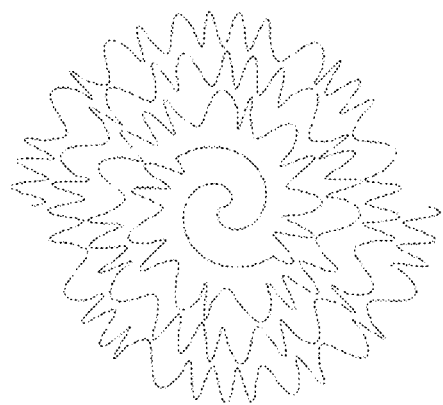
Figures 2, 18A:
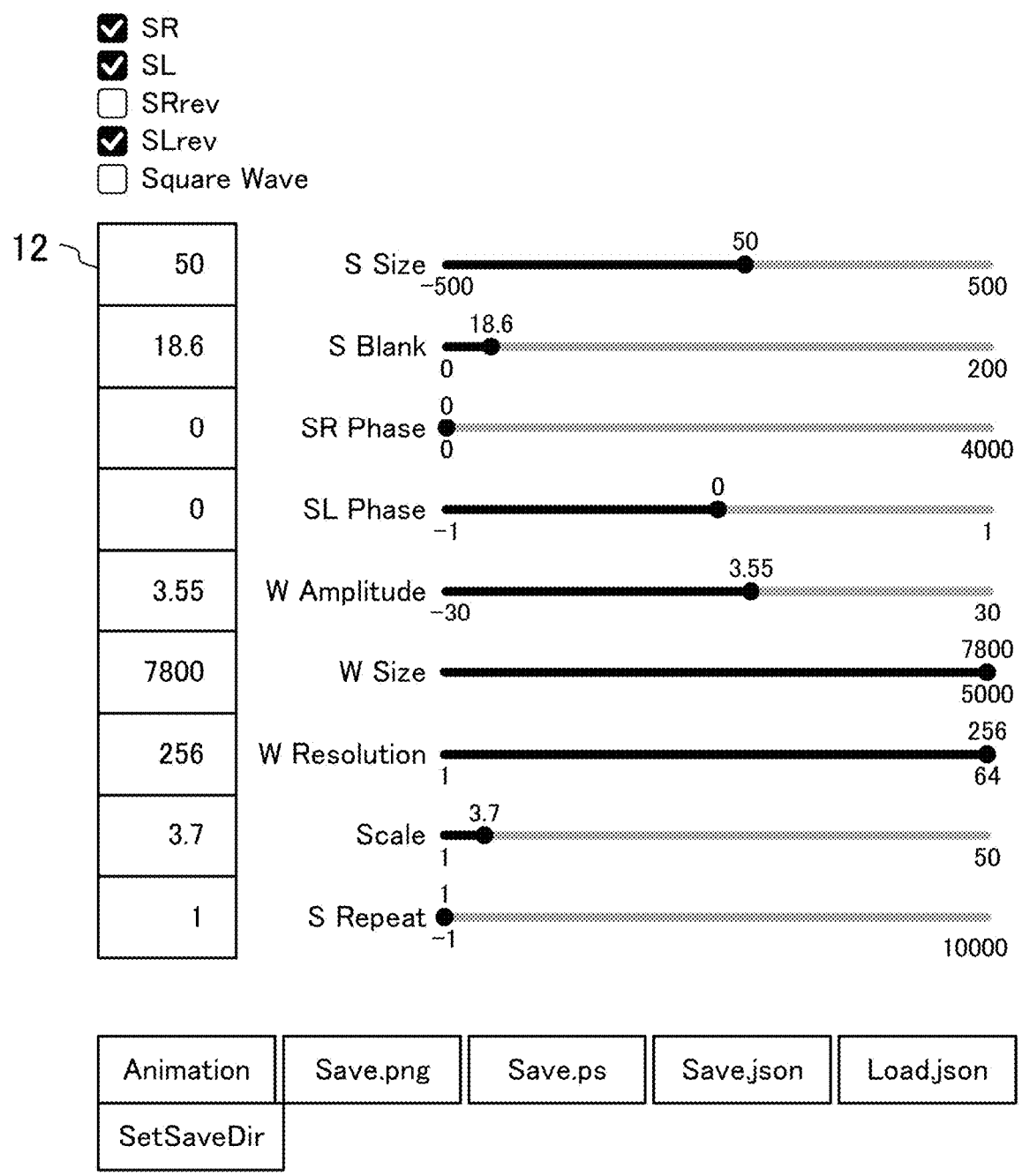
Figures 1, 18B:
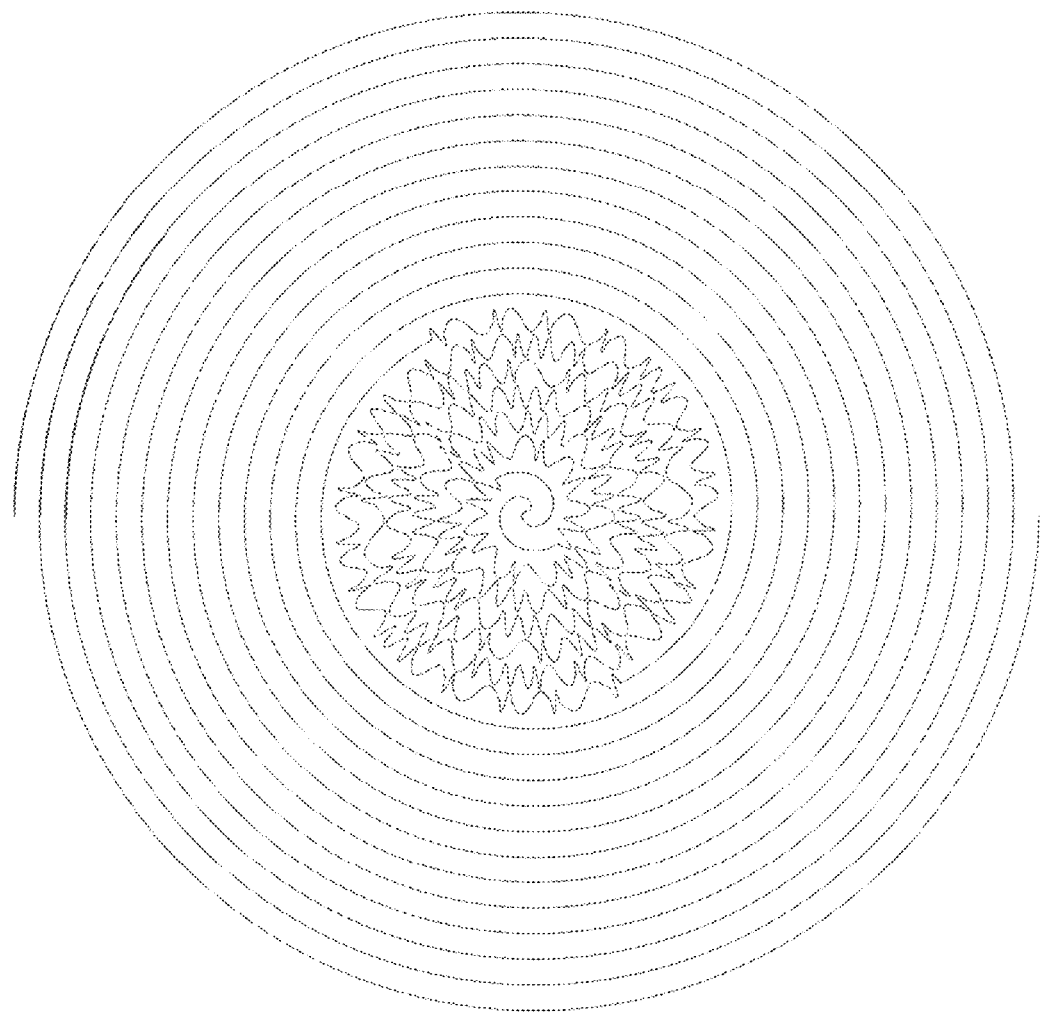
Figures 2, 18B:
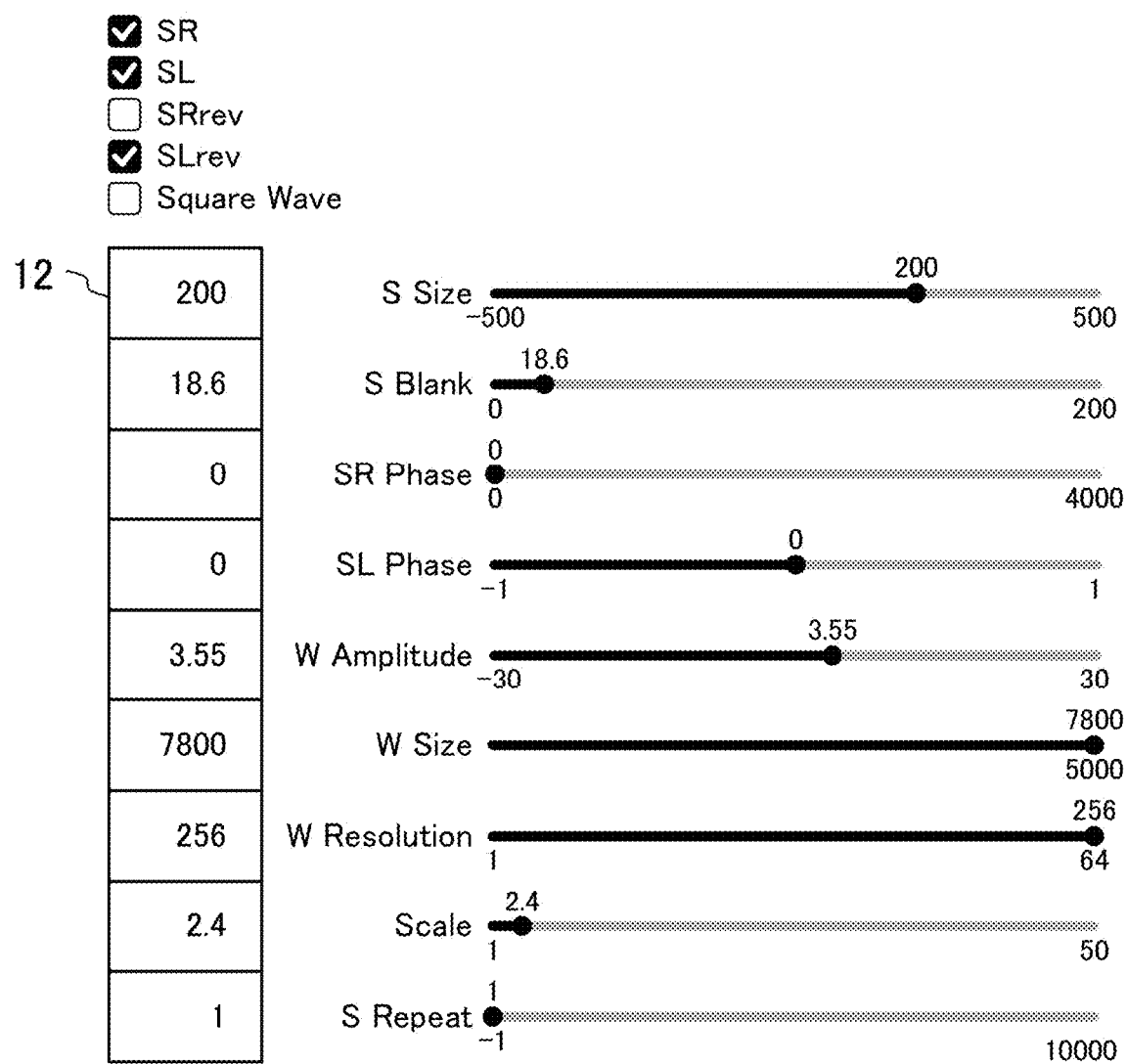

FIG. 18A-1 illustrates a case where S Size is changed as (100→50), and FIG. 18A-2 is a diagram illustrating a user interface corresponding to the diagram shown in FIG. 18A-1. FIG. 18B-1 illustrates a case where S Size is changed as (100→200), and FIG. 18B-2 is a diagram illustrating a user interface corresponding to the diagram shown in FIG. 18B-1. In a portion where a waveform is not adapted, displacement in the normal direction is 0, and therefore, the Archimedes spiral line (or the involute curve) is kept.

[B Blank]

A size of the initial blank portion B in S is set.

Figures 1, 19:
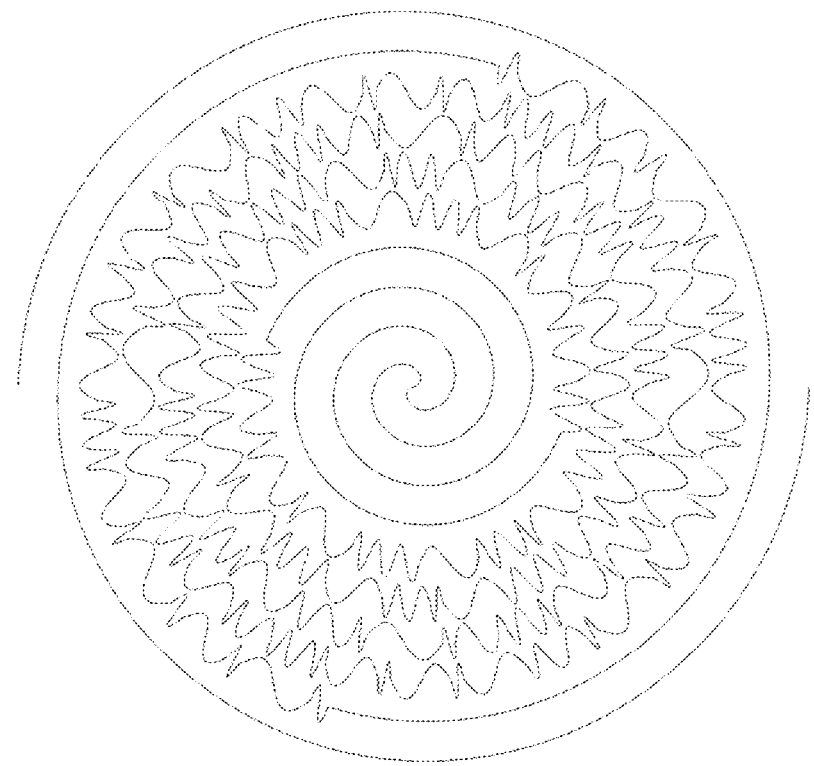
Figures 2, 19:
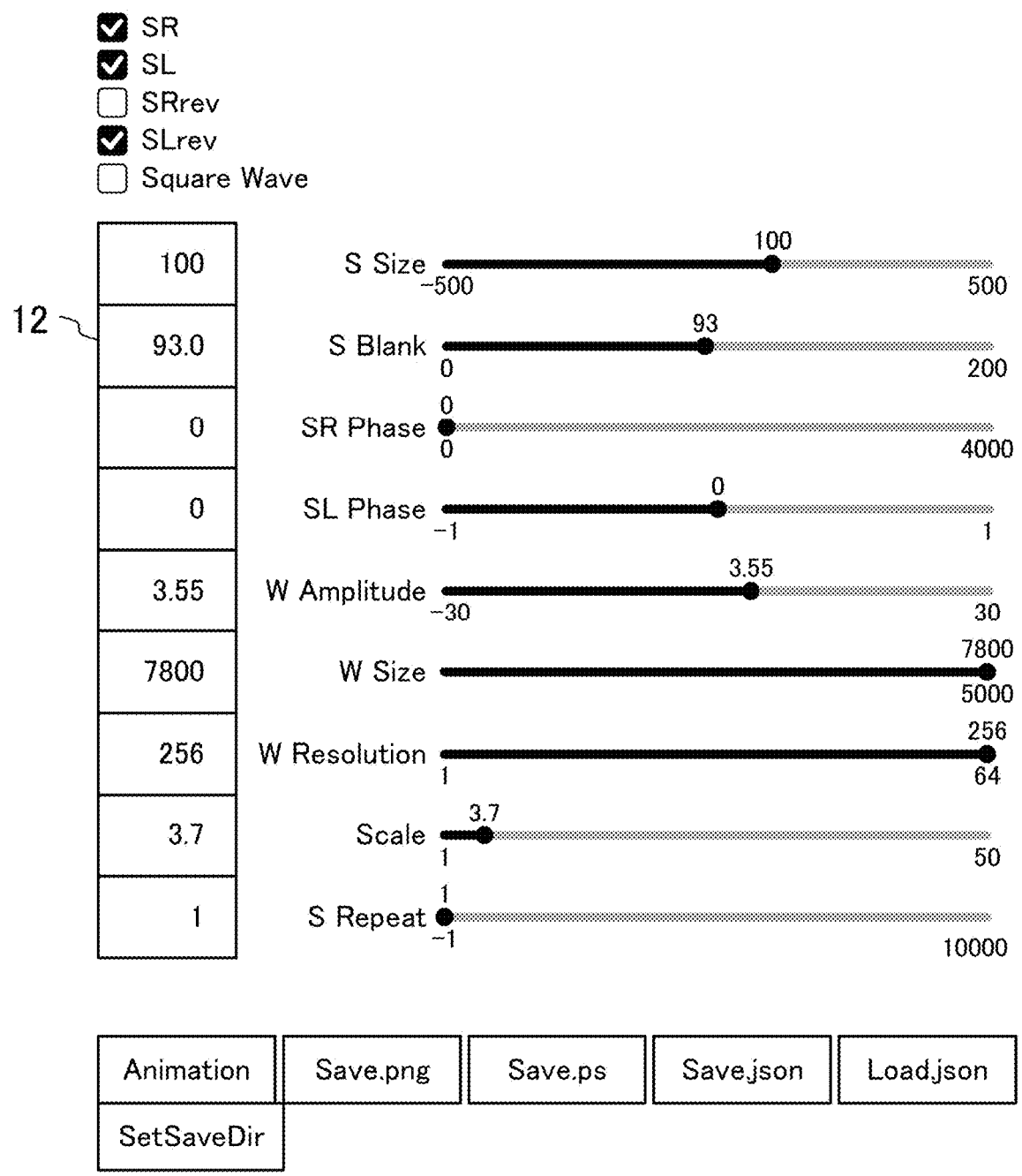

An example where a value of [S Blank] is changed based on another value of the basic figure will be described below. As illustrated in FIGS. 19-1 and 19-2, a value of S Blank is set to (18, 6→93) that is five times the value of the basic figure.

[SR Phase] and [SL Phase]

Each of respective phases S (φR and φL) of $S_R$ and $S_L$ in S can be set. In this case, 1 in setting represents 2π. Example: 0.5→π, 0.75→¾π.

Figures 1, 20:
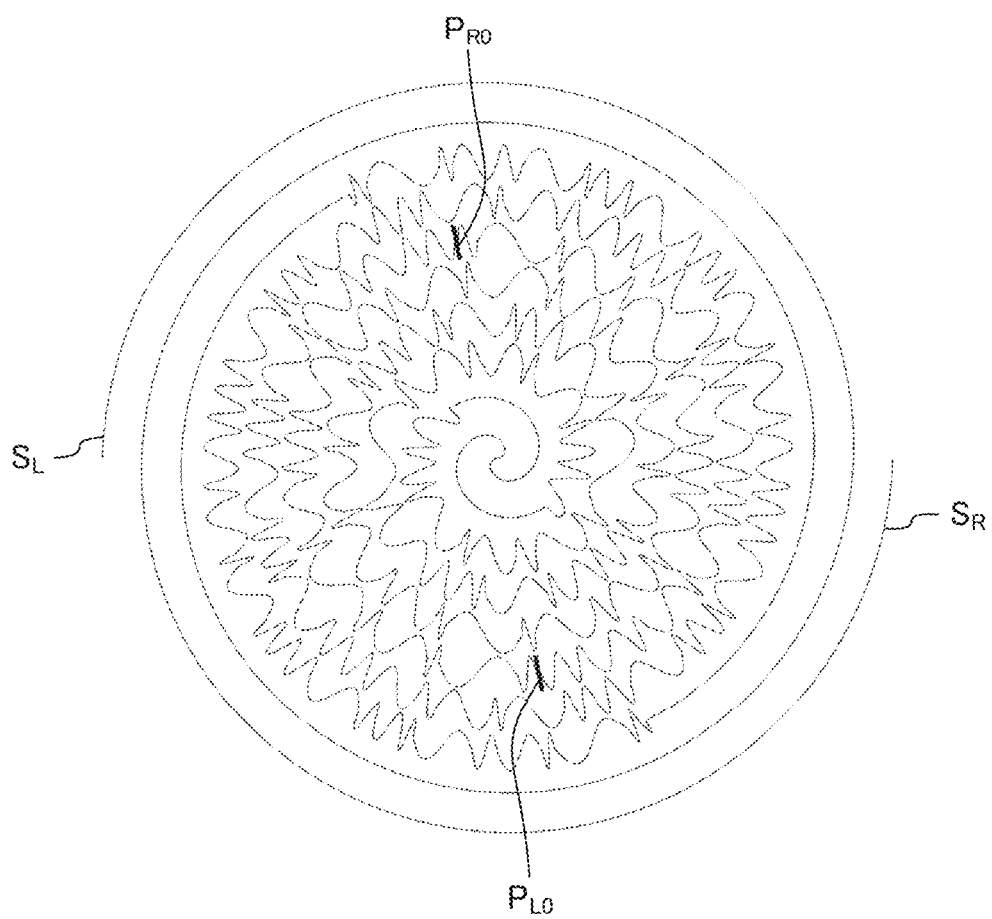
Figures 2, 20:
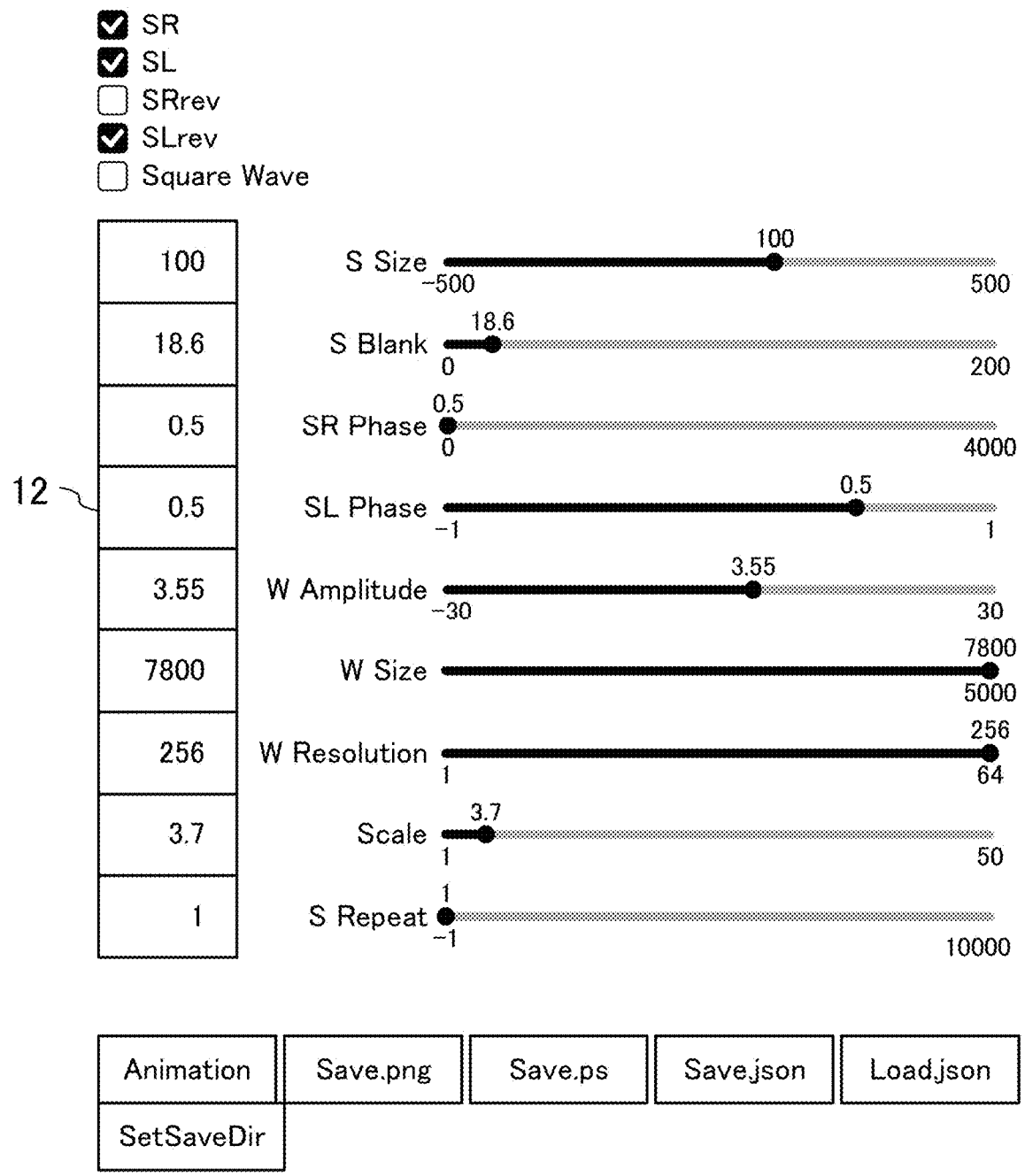

FIG. 20-1 illustrates a case where the phases S are set to S ($\varphi_R=\pi$ and $\varphi_L=\pi v$), and FIG. 20-2 is a diagram illustrating a user interface corresponding to the diagram shown in FIG. 20-1. A $P_{R0}$ point and a $P_{L0}$ point are marked with bold markers in the normal direction in order to make the points easy to distinguish. As described above, marking with the bold markers is possible in setting of the software. For example, with a start point of an initial value of a sequence of numbers marked with the bold marker, a start point of information can be known at a glance and, advantageously, decryption can be easily performed.

[W Amplitude]

A height component d in the normal direction can be set. In order to make decryption easy, low fog height setting is preferable. The height may be set to suit an aesthetic preference.

Figures 1, 21A:
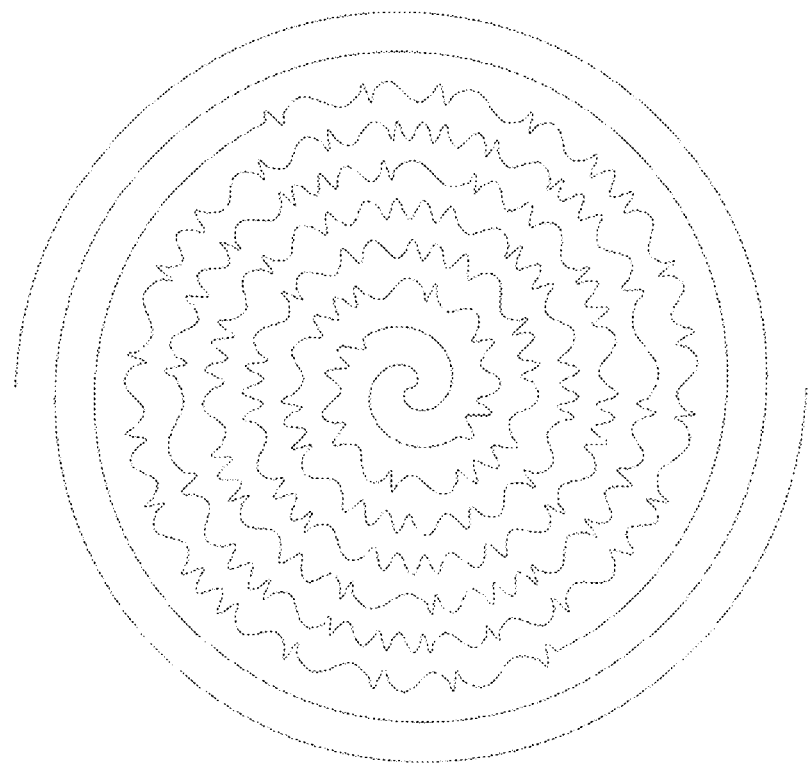
Figures 2, 21A:
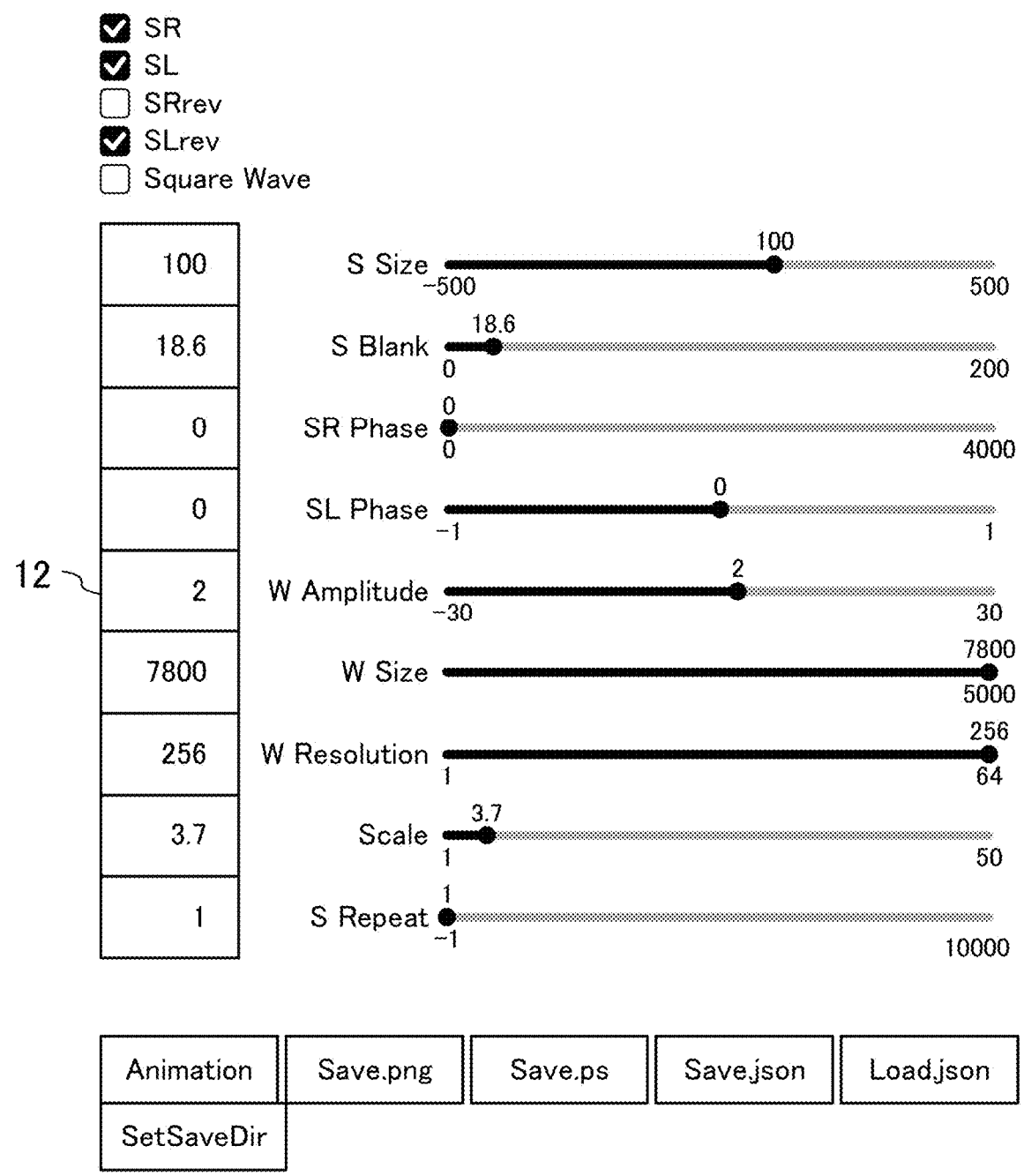

FIG. 21A-1 illustrates a case where W Amplitude is set as 3→2 (is set to ⅔ of that of the basic figure), and FIG. 21A-2 is a diagram illustrating a user interface corresponding to the diagram shown in FIG. 21A-1.

Figures 1, 21B:
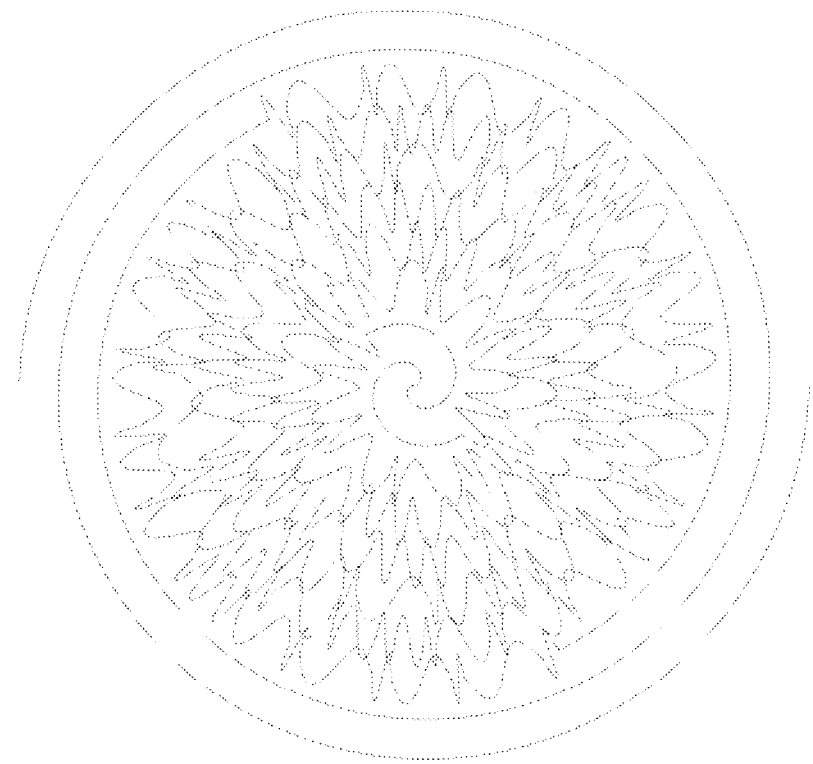
Figures 2, 21B:
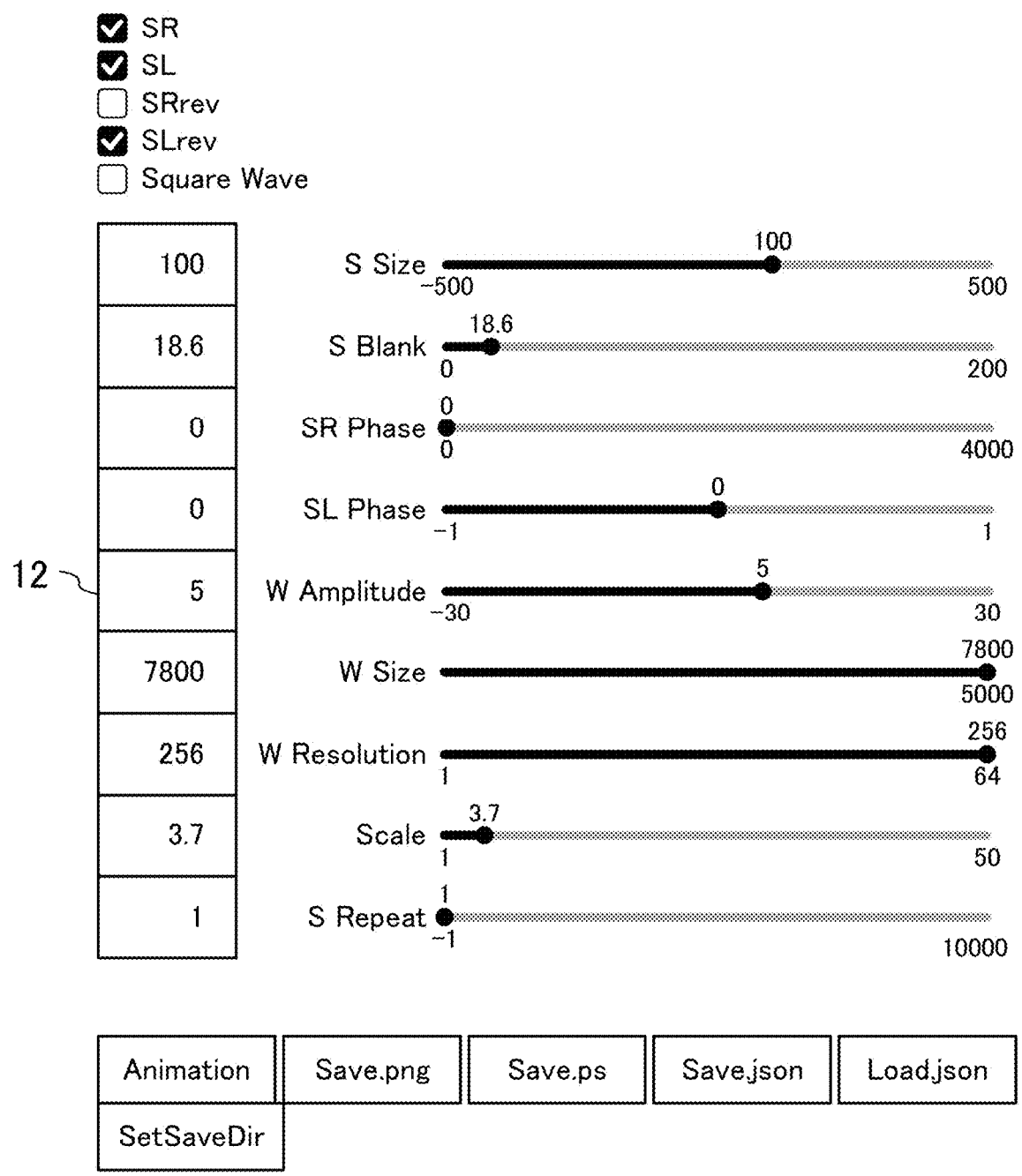

FIG. 21B-1 illustrates a case where W Amplitude is set as 3→5 (is set to 5/3 of that of the basic figure), and FIG. 21B-2 is a diagram illustrating a user interface corresponding to the diagram shown in FIG. 21B-1.

[W Size]

A real value of M can be set. Note that, in this embodiment, for a reason regarding a program version, the value of M is multiplied by an inverse number of W size. However, the multiplication by the inverse number may not be necessary.

Figures 1, 22A:
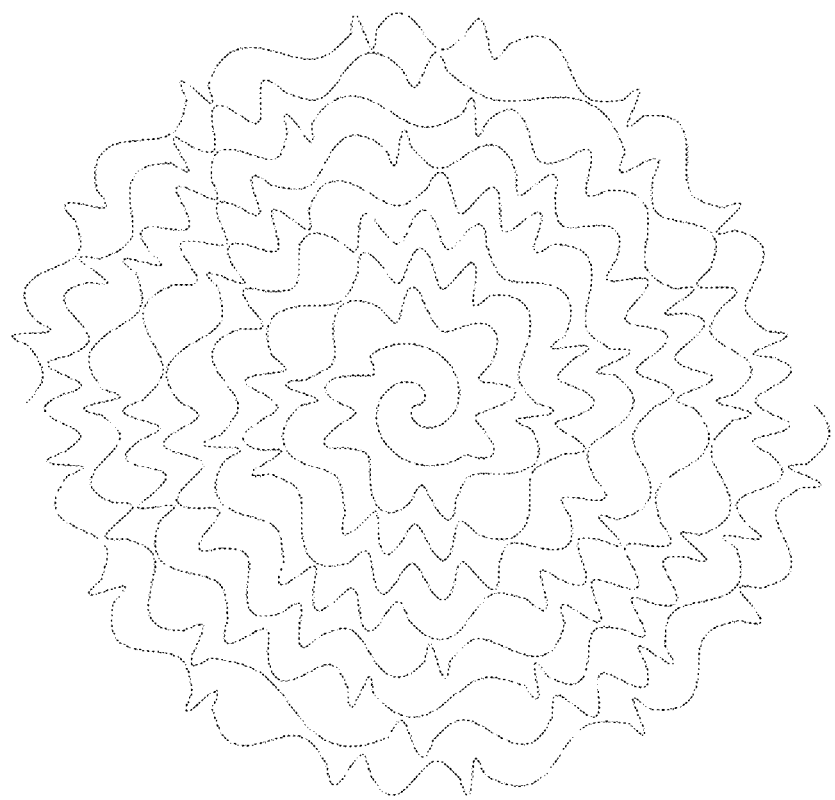
Figures 2, 22A:
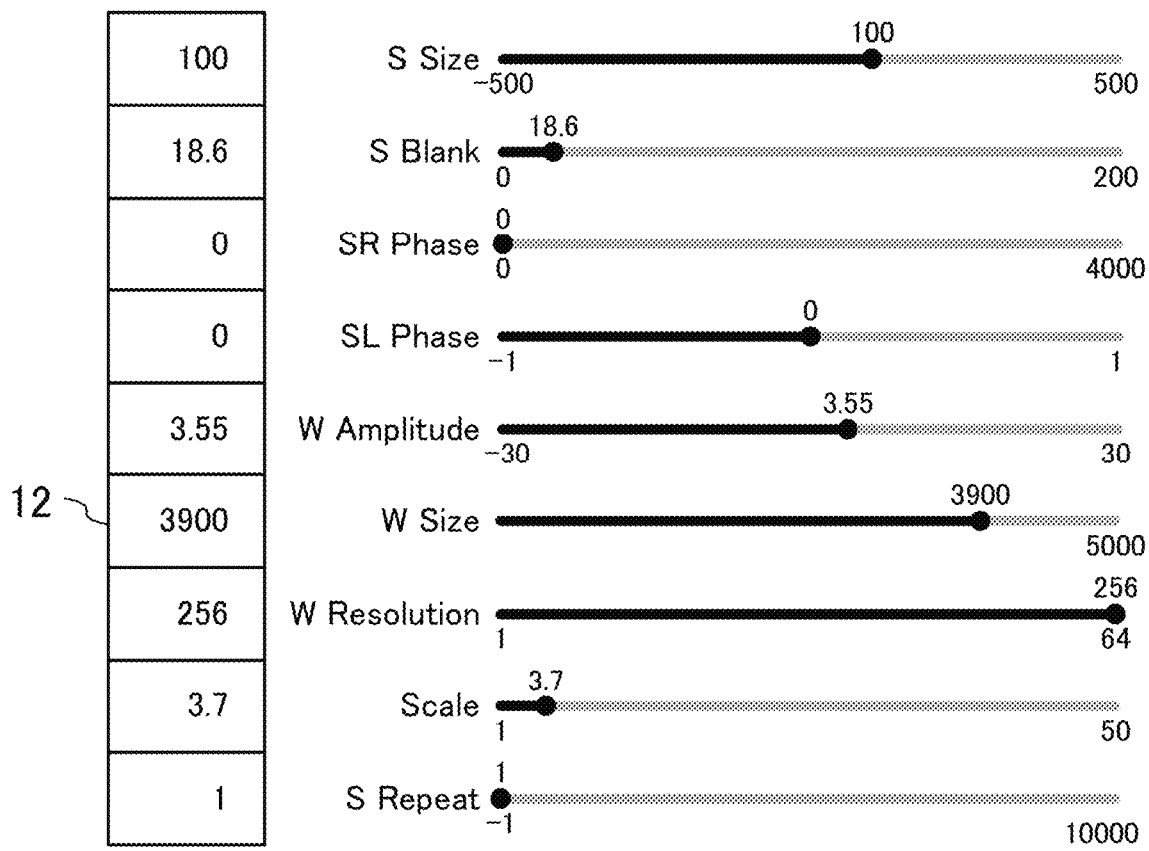

FIG. 22A-1 is a diagram illustrating a case where W Size is set as 7800→3900, and FIG. 22A-2 is a diagram illustrating a user interface corresponding to the diagram shown in FIG. 22A-1. When it is assumed that a reference value is M, multiplication by the inverse number of W size is performed, and thus, the reference value becomes 2M.

Figures 1, 22B:
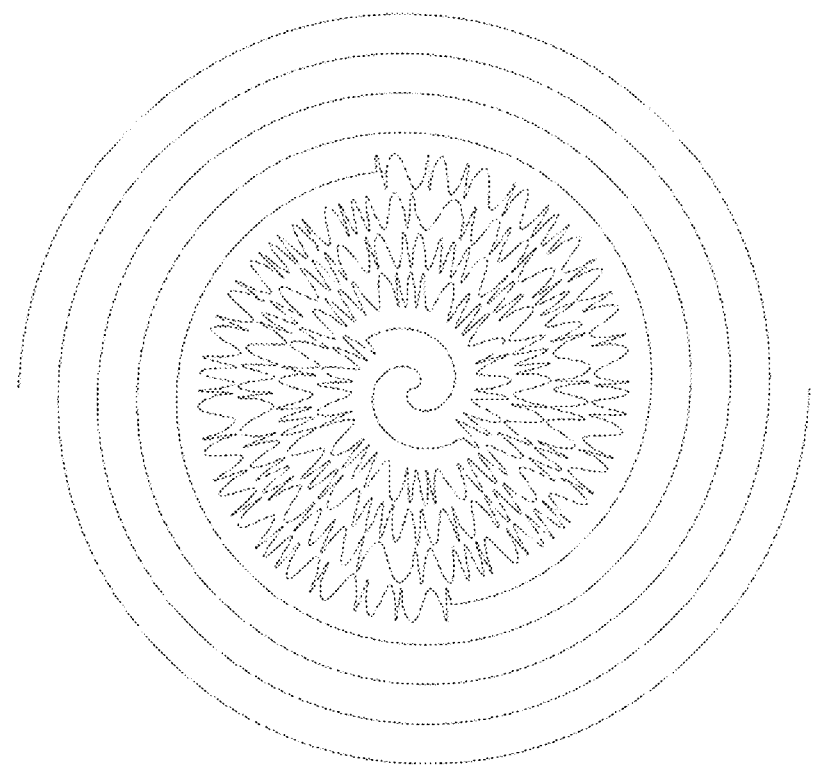
Figures 2, 22B:

FIG. 22B-1 is a diagram illustrating a case where W Size is set as 7800→15600, and FIG. 22B-2 is a diagram illustrating a user interface corresponding to the diagram shown in FIG. 22B-1. When it is assumed that the reference value is M, →½M is set, since multiplication by the inverse number is performed.

[W Resolution]

Figures 1, 23:
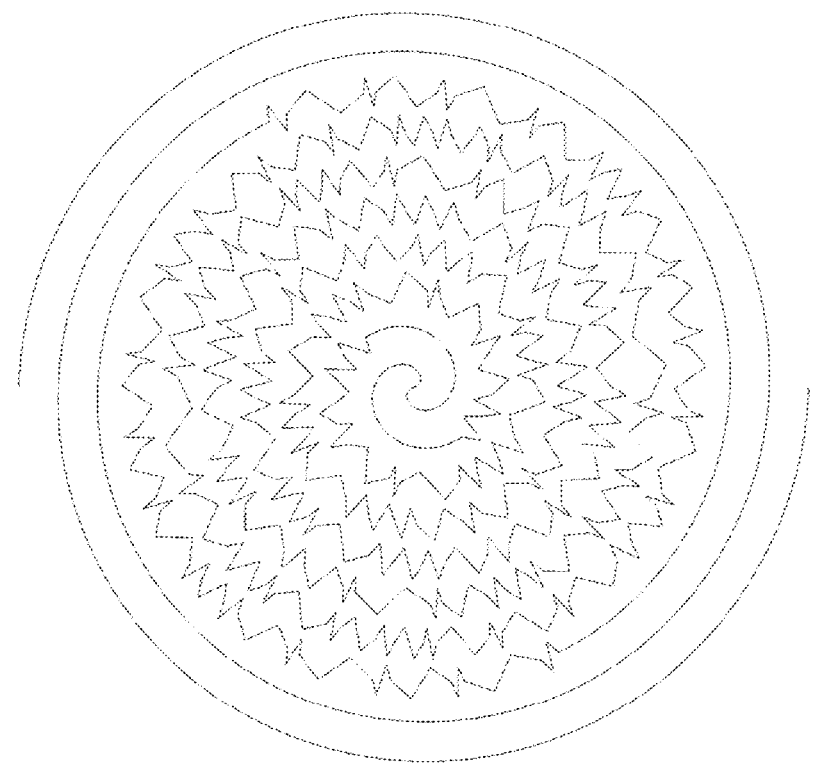
Figures 2, 23:

The division number Q is set. FIG. 23-1 is a diagram illustrating a case where W Resolution is changed as 256→3, and FIG. 23-2 is a diagram illustrating a user interface corresponding to the diagram shown in FIG. 23-1. The division number Q is 256→3.

[Scale]

A scale of entire S is set. This setting affects the preview screen and file output.

Figures 1, 24A:
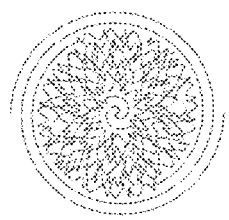
Figures 2, 24A:
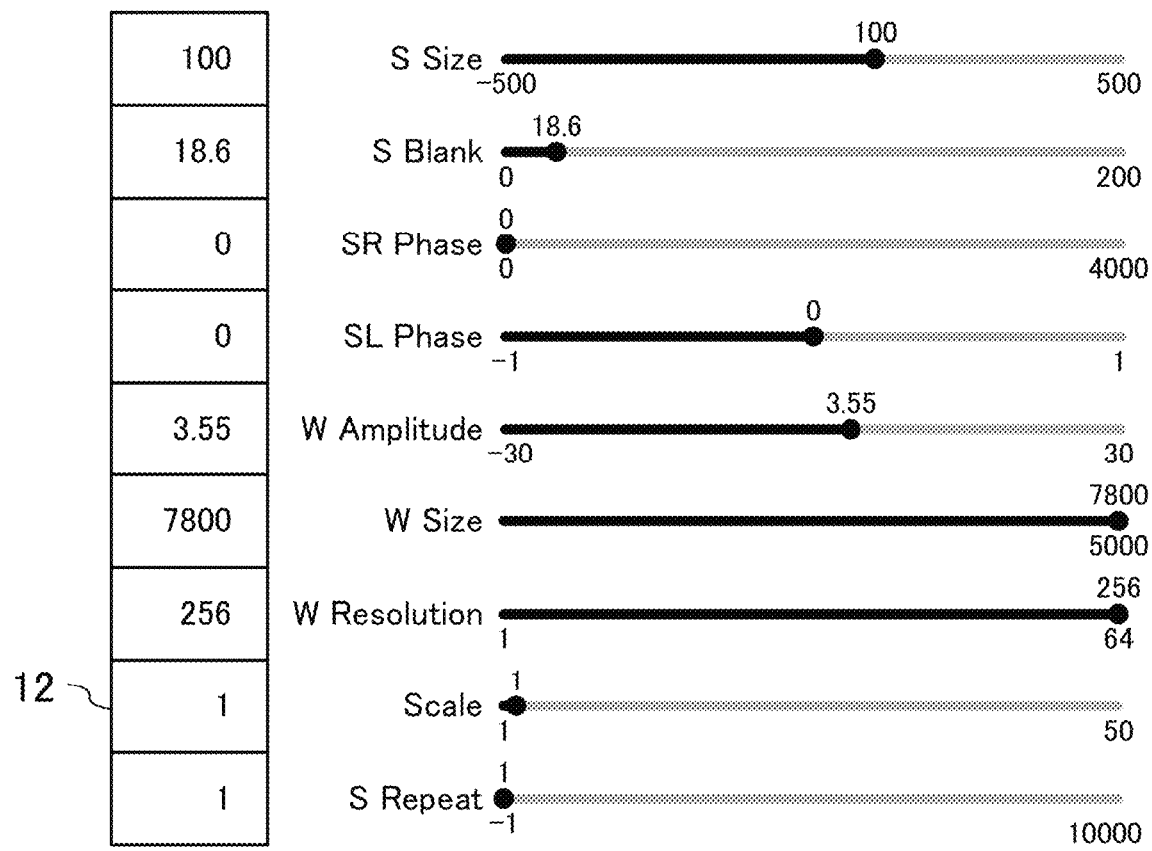

FIG. 24A-1 is a diagram illustrating a case where Scale is set as 3.7→1.0, and FIG. 24A-2 is a diagram illustrating a user interface corresponding to the diagram shown in FIG. 24A-1. S is reduced in size by a scale of 1/3.7.

Figures 1, 24B:
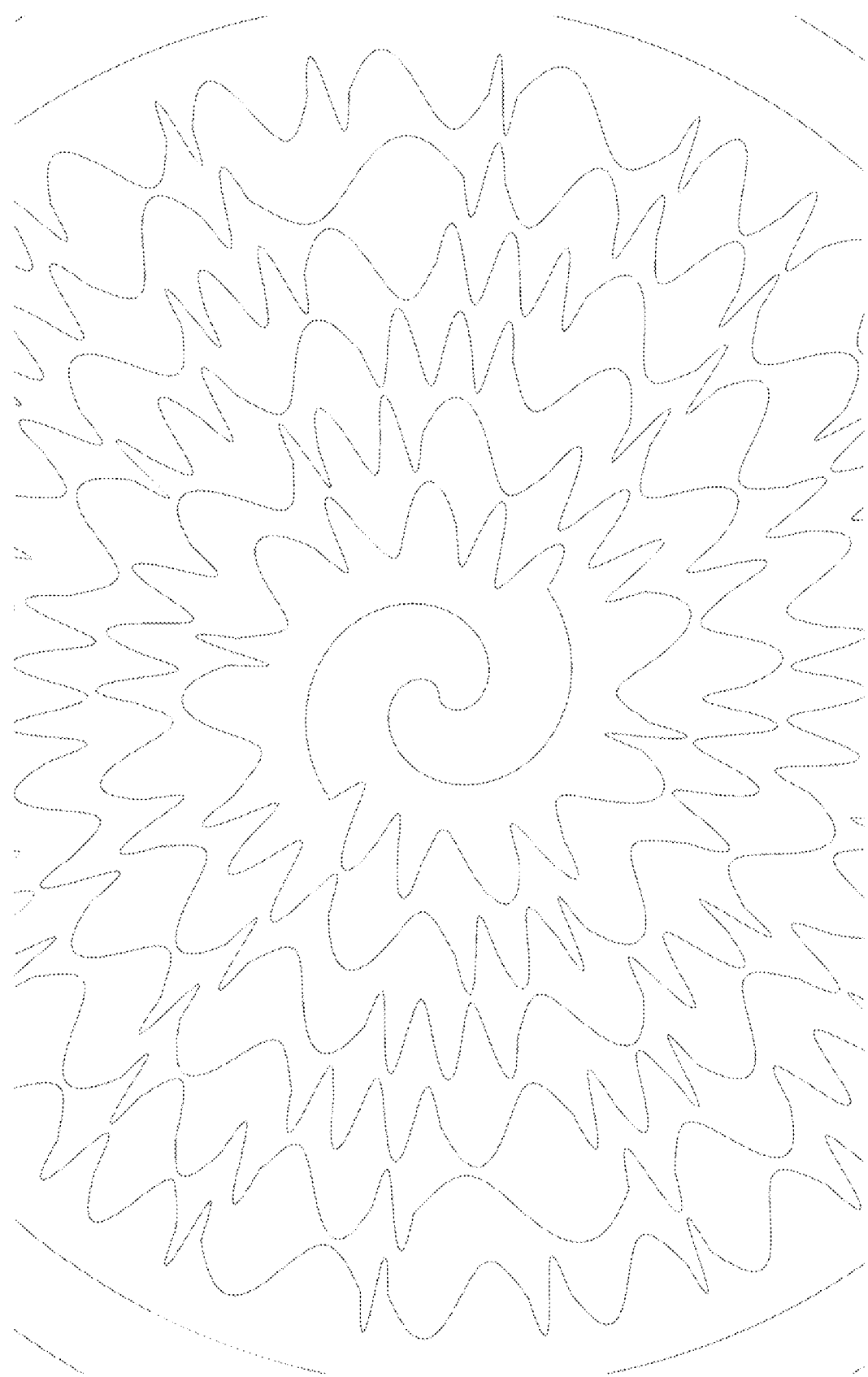
Figures 2, 24B:
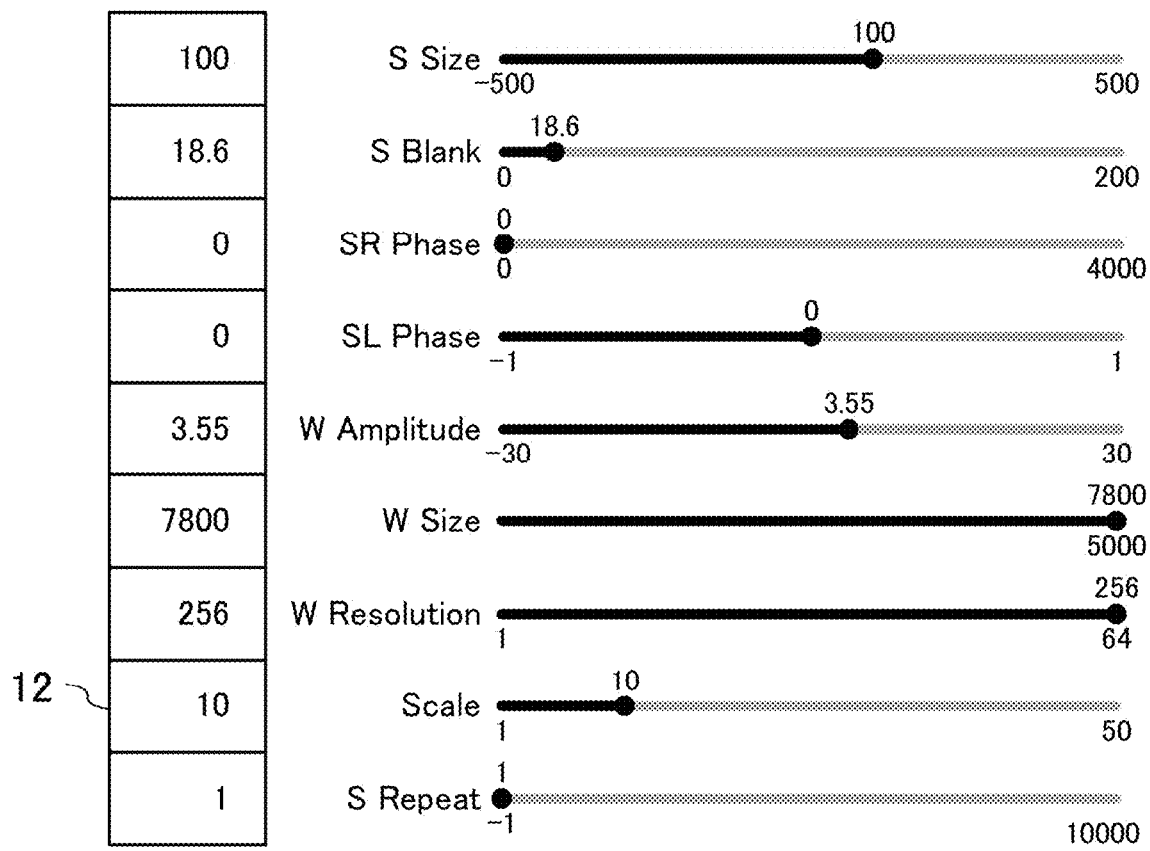

FIG. 24B-1 is a diagram illustrating a case where Scale is set as 3.7→10.0, and FIG. 24B-2 is a diagram illustrating a user interface corresponding to the diagram shown in FIG. 24B-1. S is increased in size by a scale of 10.0/3.7.

[S Repeat]

Figures 1, 25:
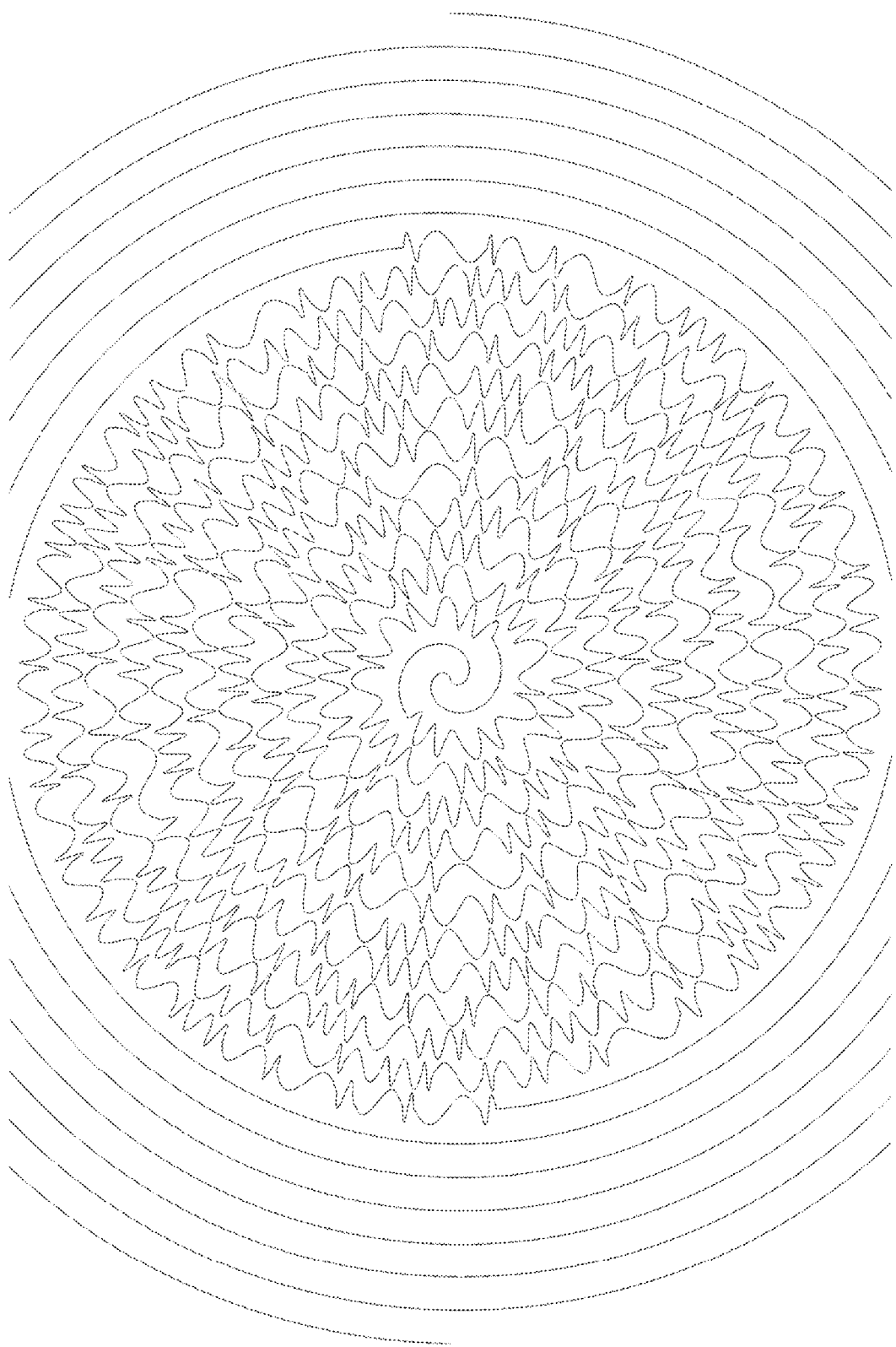
Figures 2, 25:
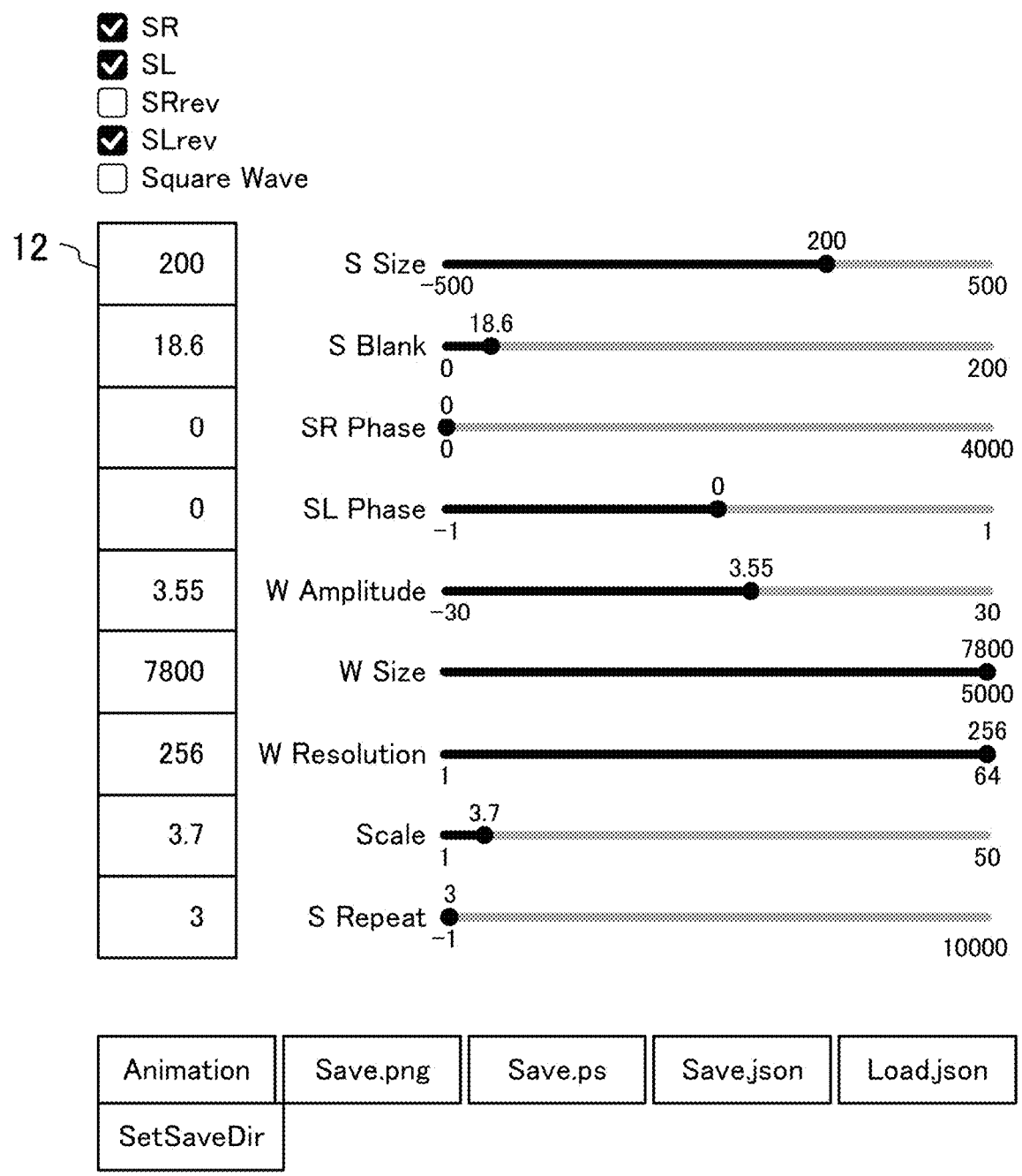

The repetition number P in S is set. FIG. 25-1 is a diagram illustrating a case where S Repeat is set as 1→3, and FIG. 25-2 is a diagram illustrating a user interface corresponding to the diagram shown in FIG. 25-1. In FIG. 25, the repetition number is set as 1→3.

Figures 1, 26:
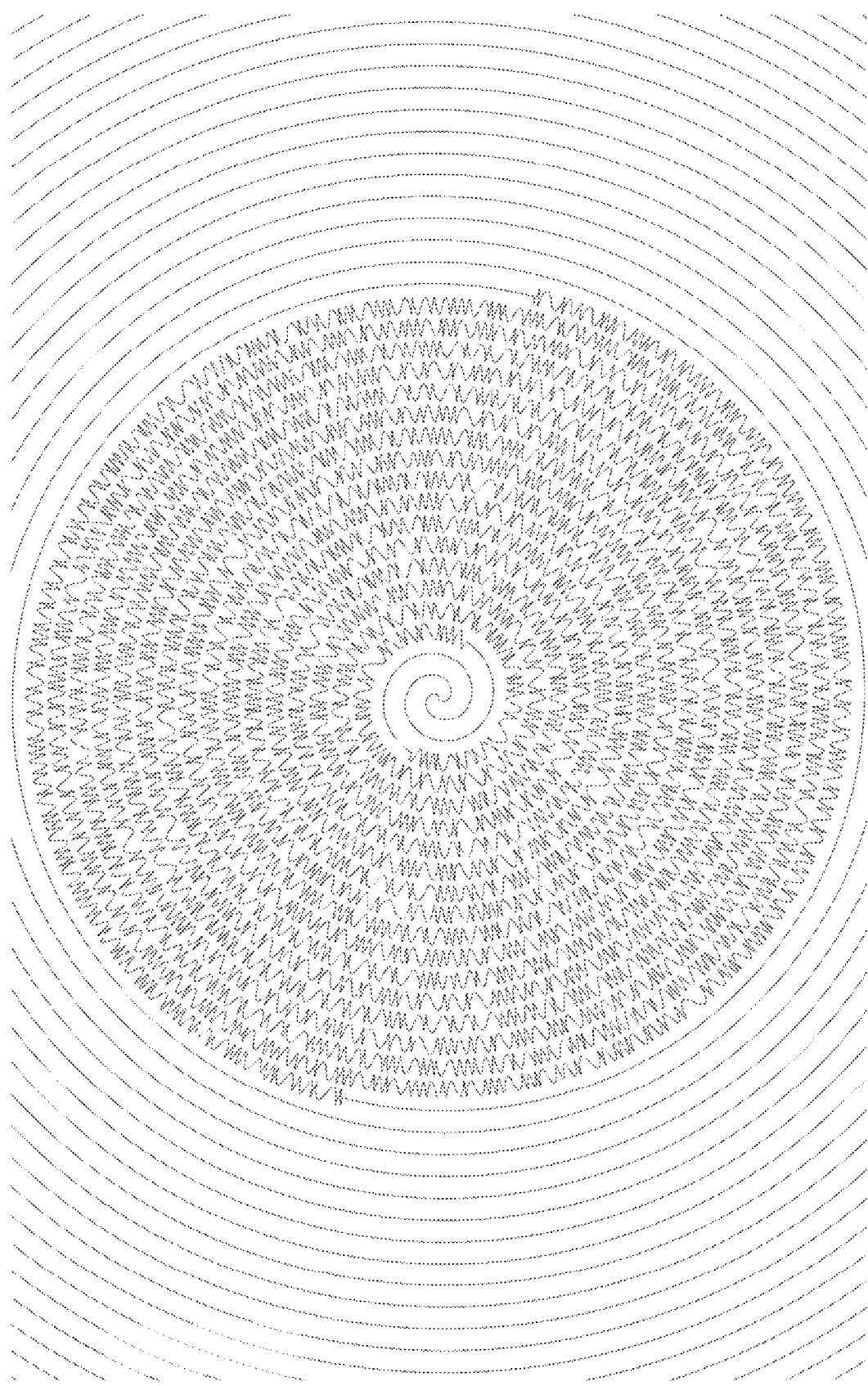
Figures 2, 26:
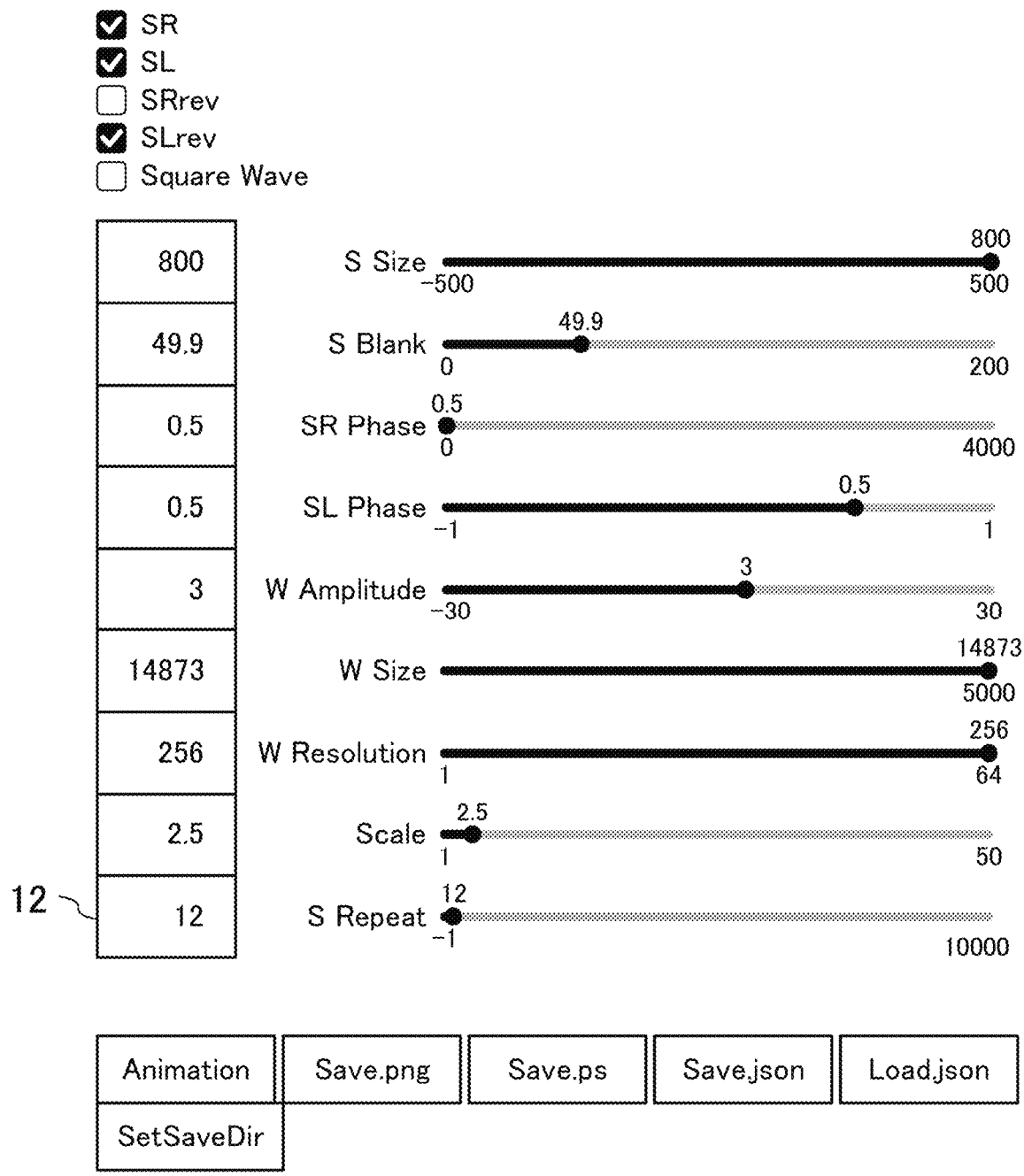

FIG. 26-1 illustrates an example where various settings are changed, and FIG. 26-2 is a diagram illustrating a user interface corresponding to the diagram shown in FIG. 26-1.

<Button Section 13>

As for the button section 13 illustrated in a lower portion of FIG. 16B, items therein will be described in order from left.

[Animation]

The phases S ($\varphi_R$ and $\varphi_L$) are continuously changed and are output and downloaded as an image file (in a png file format) for every frame. An output in each frame is determined based on an initial value and an end value of each of the phases and a total frame number.

[Save.png]

A screen shot that is the same as a current preview screen is downloaded.

[Save.ps]

Download is performed in a post script format. By outputting data in the post script format, the data can be handled as vector data, and therefore, a high-quality final output can be achieved in printing and laser marking. For example, printing on a surface of a sticker, a plastic product, or a metal product is possible, and laser marking on a surface of a metal product or a mirror by the laser processing machine 4' as a surface processing machine is possible. For example, information that a user does not want others to know or the like can be marked on a product and allows the user to carry the product or hang the product in the user's room, so that the user can feel peace and happy.

The surface processing machine is not limited to the laser processing machine 4'. Printing or etching may be performed by a printing machine or an etching machine.

[Save.ison]

Current each setting information in the user interface 20 can be downloaded in a json format.

[Load.json]

Each setting information is loaded in the json format. In the setting information, array data A is set. That is, before operating this software, the array data A is saved in the json format, and is read. When an animation is used, necessary setting information (initial phase, end phase, and frame number) needs to be also set in a json file in advance and read.

[SetSaveDir]

A folder (directory) of a download destination is set. When this setting is not performed, the file is downloaded in a place of a default setting of a used OS.

Note that, in downloading the animation, a large amount of files are downloaded in some cases, and therefore, it is preferable that a download destination is set.

On the other hand, in decrypting encrypted information, by performing proper normalization on a measured numerical value, the information can be correctly decrypted. For example, when a resulted measured value is [0.499874], after normalization, [0.5] is obtained, and decryption information is "A", based on the encryption code.

In principle, decryption using a computer is used. When there is a sufficiently large distance, a person can decrypt by visual recognition or using a measuring instrument, such as a compass, a ruler, or the like if the person has an encryption code table or the like at hand.

The computer performs calculation on a specific curved line (for example, $C_{R1(5)}$) to obtain a length of the curved line.

The computer performs scanning and applies a scanning result to a specific analysis program.

A short phrase, such as "thank you" or the like, or a character string of a URL can be easily recognized.

According to the present disclosure, a spiral line or an involute curve with a beautiful appearance is output, and therefore, the technology disclosed herein can be differentiated from an existing technology, such a QR code technology or the like.

According to this embodiment, a pattern generated as a characteristic of the present technology leads a design characteristic with a beautiful appearance of a certain type as a result. Use of this technology can relieve a restriction in design on a designer that occurs in a course of duty as in a known QR code and a bar code to increase freedom, and can contribute to a creative field.

OTHER EMBODIMENTS

According to the present disclosure, the embodiment described above may have the following configuration.

That is, in the embodiment described above, as an example of the computer, the personal computer (PC) has been described. However, the computer may be physically configured in any way, as long as the computer includes a memory that stores the programs described above and a CPU (processor) that executes the programs. For example, the computer may be a computer, such as a microcomputer, a programmable logic controller (PLC), or the like, that uses a software (program). As another option, the computer may be realized by combining hardware (circuit components).

Note that the embodiment described above is merely a preferable example by nature and is not intended to be particularly limiting the present disclosure, application of the present disclosure, and the scope of use.

What is claimed is:

1. An encryption method for encrypting a piece of information using a spiral pattern, the encryption method comprising:
    creating, by a processor, an encryption code table that contains
        a plurality of encryption codes, and
        a plurality of numerical values respectively allocated to the plurality of encryption codes;
    encrypting, by the processor, the piece of information using the encryption code table, to thereby obtain an array of the numerical values; and
    converting, by the processor, each numerical value in the array to a wave segment having a wavelength corresponding to a multiple of said each numerical value, the plurality of wave segments being connected to form a continuous wave that spirals outward in the spiral pattern.

2. The encryption method according to claim 1, wherein the spiral pattern is an algebraic spiral in a circular area.

3. The encryption method according to claim 1, wherein the spiral pattern is an involute spiral in a circular area.

4. The encryption method according to claim 1, wherein each of the wave segments is a segment of a sine wave or a square wave.

5. The encryption method according to claim 1, wherein the spiral pattern spirals outward from a center thereof, and
    the continuous wave starts from a predetermined position on the spiral pattern that is not the center, such that the spiral pattern has an initial blank portion.

6. The encryption method according to claim 1, further comprising:
    rotating the spiral pattern of the continuous wave by 180 degrees, and
    combining the spiral pattern and the rotated spiral pattern by superimposing the rotated spiral pattern onto the spiral pattern with centers thereof coinciding.

7. The encryption method according to claim 6, wherein each of the wave segments in the spiral pattern and/or the rotated spiral pattern is so shaped to have a height of a normal line thereof in a predetermined direction pattern.

8. The encryption method according to claim 1, wherein the continuous wave is stored as a still image.

9. The encryption method according to claim 1, wherein the continuous wave is stored as a moving image with a lapse of time.

10. The encryption method according to claim 1, wherein a start point of the continuous waves is configured to be displayable.

11. A decryption method, comprising:
reading, by a reading device, the continuous wave including the plurality of wave segments in the spiral pattern generated in accordance with the encryption method of claim 1;
converting, by a second processor, the wavelength of each of the wave segments to one of the numerical values, to thereby obtain the array of the numerical values; and
decrypting, by the second processor, the array of the numerical values using the encryption code table.

12. A method for printing, marking, or etching a design encrypted by the encryption method according to claim 1, the method comprising:
instructing, by a third processor, a surface processing machine to print, mark, or etch the spiral pattern generated in accordance with the encryption method of claim 1 on a surface of a product.

* * * * *